US012750335B2

(12) United States Patent
Chen et al.

(10) Patent No.: US 12,750,335 B2
(45) Date of Patent: Sep. 29, 2026

(54) COMMUNICATION METHOD AND APPARATUS

(71) Applicant: HUAWEI TECHNOLOGIES CO., LTD., Shenzhen (CN)

(72) Inventors: Zehao Chen, Shenzhen (CN); Yongcui Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 18/408,669

(22) Filed: Jan. 10, 2024

(65) Prior Publication Data

US 2024/0154933 A1 May 9, 2024

Related U.S. Application Data

(63) Continuation of application No. PCT/CN2022/103818, filed on Jul. 5, 2022.

(30) Foreign Application Priority Data

Jul. 16, 2021 (CN) ........................ 202110810737.X

(51) Int. Cl.
*H04L 61/4511* (2022.01)
*H04W 76/10* (2018.01)

(52) U.S. Cl.
CPC ......... *H04L 61/4511* (2022.05); *H04W 76/10* (2018.02)

(58) Field of Classification Search
CPC ..... H04L 61/4511; H04L 61/00; H04L 61/58; H04W 76/10; H04W 8/14; H04W 88/14
See application file for complete search history.

(56) References Cited

U.S. PATENT DOCUMENTS

2022/0321475 A1* 10/2022 Thiebaut ................. H04L 47/11
2023/0086304 A1* 3/2023 Xiong ................... H04W 76/10 370/329
2024/0187374 A1* 6/2024 Tang ..................... H04L 41/085

FOREIGN PATENT DOCUMENTS

CN 113115480 A 7/2021
CN 113691969 A 11/2021
WO 2021064717 A1 4/2021

OTHER PUBLICATIONS

SA WG2 Meeting#145ES2-2104044, DNS message transfer between EASDF and DNS server (located in DN) through PSA UPF, China Mobile, May 17-28, 2021, Electronic meeting, total 6 pages.

(Continued)

*Primary Examiner* — Michael A Keller
*Assistant Examiner* — Thao D Duong
(74) *Attorney, Agent, or Firm* — HAUPTMAN HAM, LLP

(57) ABSTRACT

A communication method and apparatus. A session management function obtains at least one group of first association relationships, where the first association relationship is a correspondence between identification information of domain name system DNS handling information and the DNS handling information. The SMF sends, to an EASDF, the at least one group of first association relationships used for PDU sessions of a plurality of terminal devices, and sends, to the EASDF, a first message corresponding to a first PDU session, where the first information includes first identification information, and the first identification information is identification information of DNS handling information corresponding to the first PDU session. The EASDF receives the first association relationship and the first message, and determines, based on the first association relationship and the first identification information, the DNS handling information corresponding to the first PDU session.

20 Claims, 7 Drawing Sheets

(56) References Cited

OTHER PUBLICATIONS

Japanese Office Action issued in corresponding Japanese Application No. 2024-502180, dated Apr. 1, 2025, pp. 1-11.
Lenovo et al.: "SMF selecting an EAS application server by taking into account NWDAF analytics", 3GPP Draft; S2-2105040, 3rd Generation Partnership Project (3GPP), Mobile Competence Centre; 650, Route Des Lucioles; F-06921 Sophia-Antipolis Cedex; France; vol. SA WG2, No. eMeeting; May 17, 2021-May 28, 2021 Jun. 1, 2021 (Jun. 1, 2021), XP052021980, total 7 pages.
ZTE: "KI#1 EAS Discovery Procedure with EASDF", 3GPP Draft; S2-2102902, 3rd Generation Partnership Project (3GPP), Mobile Competence Centre; 650, Route Des Lucioles; F-06921 Sophia-Antipolis Cedex; France vol. SA WG2, No. e-meeting; Apr. 12, 2021-Apr. 16, 2021 Apr. 6, 2021 (Apr. 6, 2021), XP051994260, total 5 pages.
VIVO: "Solution for the KI#4: Discovery of the same EAS for collections of UEs", 3GPP Draft; S2-2202473, 3rd Generation Partnership Project (3GPP), Mobile Competence Centre; 650, Route Des Lucioles; F-06921 Sophia-Antipolis Cedex; France vol. SA WG2, No. Elbonia; Apr. 6, 2022-Apr. 12, 2022 Mar. 29, 2022 (Mar. 29, 2022), XP052133310, total 5 pages.
Extended European Search Report issued in corresponding European Application No. 22841221.9, dated Jul. 15, 2024, pp. 1-10.
3GPP TS 23.548 V1.0.0 (Jun. 2021), 3rd Generation Partnership Project; Technical Specification Group Services and System Aspects;5G System Enhancements for Edge Computing;Stage 2 (Release 17),total 48 pages.
International Search Report issued in corresponding International Application No. PCT/CN2022/103818, dated Sep. 20, 2022, pp. 1-12.
Taiwan Office Action issued in corresponding Taiwan Application No. 111126619, dated Feb. 7, 2023, pp. 1-60.

* cited by examiner

COMMUNICATION METHOD AND APPARATUS

CROSS-REFERENCE TO RELATED APPLICATIONS

This application is a continuation of International Application No. PCT/CN2022/103818, filed on Jul. 5, 2022, which claims priority to Chinese Patent Application No. 202110810737.X, filed on Jul. 16, 2021. The disclosures of the aforementioned applications are hereby incorporated by reference in their entireties.

BACKGROUND

The standard TS 23.548 of the 3rd generation partnership project (3rd generation partnership project, 3GPP) defines a new network element that assists in discovering an edge application server (edge application server, EAS), namely, an edge application server discovery function (edge application server discovery function, EASDF). A main function of the EASDF is to process a domain name system (domain name system, DNS) message based on an indication of a session management function (session management function, SMF).

In a procedure of discovering the EAS by using the EASDF, the SMF sends, to the EASDF, a DNS information handling rule and an EDNS client subnet option (which is also referred to as an “ECS option” for short) at a protocol data unit (protocol data unit, PDU) session granularity. However, DNS information handling rules and ECS options that are sent in a large number of PDU sessions are the same, thereby resulting in repeated sending of information. In addition, in response to the DNS information handling rules being updated, the SMF updates a DNS information handling rule of each PDU session, thereby causing sending of a large amount of signaling.

SUMMARY

Embodiments described herein provide a communication method and apparatus. An SMF sends, to an EASDF, a correspondence between identification information of domain name system DNS handling information and the DNS handling information, to improve information processing efficiency and service experience of a user.

According to a first aspect, a communication method is provided. The method includes: A session management function SMF obtains at least one group of first association relationships, where the first association relationship is a correspondence between identification information of domain name system DNS handling information and the DNS handling information; the SMF sends, to an edge application server discovery function EASDF, the at least one group of first association relationships used for protocol data unit PDU sessions of a plurality of terminal devices; and the SMF sends, to the EASDF, a first message corresponding to a first PDU session, where the first message includes first identification information, the first identification information is identification information of DNS handling information corresponding to the first PDU session, and the first identification information is used by the EASDF to determine, based on the first identification information and the first association relationship, the DNS handling information corresponding to the first PDU session.

A first identifier in at least one embodiment is the DNS handling information corresponding to first UE or the first PDU session. In at least one embodiment, the first identifier is one of the following: a UE group ID, a rule (rule) ID, a DNAI, a DNN, S-NSSAI, or the like. For ease of description, at least one embodiment is described by using only an example in which the first identifier is a rule ID. The rule ID mentioned in the following embodiments is any one of the foregoing first identifiers. This is not limited.

This is because differentiation granularities are different in different deployment scenarios. For example, in some scenarios, different UEs correspond to different first association relationships (in this case, a UE group ID is used as identification information). In other scenarios, different PDU sessions correspond to different first association relationships (in this case, a rule ID is used as identification information).

According to the technical solutions provided in at least one embodiment, the EASDF sends, to the SMF, a correspondence between identification information of domain name system DNS handling information and the DNS handling information. In this way, the SMF sends, to the EASDF, a DNS handling rule that is based on the identification information of the DNS handling information, so that the EASDF uses different DNS handling information for different PDU sessions or UEs. This implements differentiated handling of DNS messages, and improves service experience of a user. In addition, repeated requesting and sending of information is avoided, signaling interaction is reduced, and information processing efficiency is improved.

“A plurality of terminal devices” in at least one embodiment refers to a plurality of or all terminal devices to which the first association relationships are applicable, and the plurality of PDU sessions is understood as a plurality of or all PDU sessions to which the first association relationships are applicable. Details are not described below again.

With reference to the first aspect, in some implementations of the first aspect, the DNS handling information includes DNS detection information or a DNS handling parameter; the DNS detection information is used by the EASDF to match a DNS message to determine a handling action for the DNS message; and the DNS handling parameter is used by the EASDF to match a DNS message to determine an EDNS client subnet option, so that the EASDF adds the EDNS client subnet option to the DNS message and sends the DNS message to a DNS server; or the DNS handling parameter is used by the EASDF to match a DNS message to determine a local DNS server address, and the EASDF sends the local DNS server address to a local DNS server. The DNS message is received by the EASDF from a terminal device or a DNS server.

In at least one embodiment, “the DNS detection information is used by the EASDF to match a DNS message to determine a handling action for the DNS message” alternatively means that the DNS detection information is used by the EASDF to determine a DNS message handling action corresponding to the DNS message.

In at least one embodiment, the DNS handling information alternatively is the DNS detection information and the DNS handling parameter. Details are not described below again.

Based on the foregoing technical solution, a handling parameter in at least one embodiment is the DNS detection information or the DNS handling parameter, so that the EASDF determines, based on detection information, a handling action for the DNS message. This avoids repeated requesting and sending of information. In addition, the EASDF determines the ECS option or the local DNS server address based on the DNS handling parameter. This avoids repeated requesting and sending of information, reduces signaling interaction, and improves information processing efficiency.

With reference to the first aspect, in some implementations of the first aspect, in response to the DNS handling information being the DNS detection information, the DNS detection information includes a fully qualified domain name FQDN range and/or an edge application server internet protocol address range.

Based on the foregoing technical solution, in at least one embodiment, the DNS detection information includes the FQDN range and/or the EAS IP address range, so that the EASDF performs matching based on an FQDN range and/or an EAS IP address range that are/is in the DNS message, to determine whether to report the DNS message. In this way, the SMF sends, to the EASDF, a DNS handling rule that is based on the identification information of the DNS handling information, so that the EASDF uses different DNS handling information for different PDU sessions or UEs. This implements differentiated handling of DNS messages, and improves service experience of a user.

With reference to the first aspect, in some implementations of the first aspect, the DNS detection information further includes information that is about a DNS message handling action performed by the EASDF and that is determined based on the first identification information, and the handling action includes one or more of the following types: reporting the DNS message, reporting content in the DNS message, caching the DNS message, and forwarding the DNS message.

Based on the foregoing technical solution, in at least one embodiment, the DNS detection information further includes the information about the DNS message handling action performed by the EASDF, so that the EASDF determines, based on the detection information, the information about the DNS message handling action. This improves information processing efficiency.

With reference to the first aspect, in some implementations of the first aspect, in response to the DNS handling information being the DNS handling parameter, the DNS handling parameter is a correspondence between data network access identifier DNAI information and the EDNS client subnet option, or the DNS handling parameter is a correspondence between data network access identifier DNAI information, and a fully qualified domain name FQDN and the EDNS client subnet option, or the DNS handling parameter is a correspondence between data network access identifier DNAI information and the local DNS server address, or the DNS handling parameter is a correspondence between data network access identifier DNAI information, and a fully qualified domain name FQDN and the local DNS server address, where the DNS handling parameter is determined by the SMF based on deployment information of an edge application server and deployment information of a user plane function.

Based on the foregoing technical solution, in at least one embodiment, the EASDF determines the ECS option or the local DNS server based on the DNS handling parameter. This avoids repeated requesting and sending of information, reduces signaling interaction, and improves information processing efficiency.

With reference to the first aspect, in some implementations of the first aspect, in response to the identification information of the DNS handling information being a data network access identifier DNAI, the DNS handling information is the DNS handling parameter, and the DNS handling parameter is the EDNS client subnet option, the first identification information is a first DNAI, and the first identification information is used by the EASDF to match the first association relationship to determine the EDNS client subnet option, so that the EASDF adds the EDNS client subnet option to the DNS message and sends the DNS message to a DNS server, where the first DNAI is DNAI associated with a location of a terminal device, the DNS message is received by the EASDF from the terminal device, and the DNS handling parameter is determined by the SMF based on deployment information of an edge application server and deployment information of a user plane function.

With reference to the first aspect, in some implementations of the first aspect, in response to the identification information of the DNS handling information being a data network access identifier DNAI, the DNS handling information is the DNS handling parameter, and the DNS handling parameter is a correspondence between a fully qualified domain name FQDN and the EDNS client subnet option, the first identification information is a first DNAI, and the first identification information and the DNS message are used by the EASDF to match the first association relationship to determine the EDNS client subnet option, so that the EASDF adds the EDNS client subnet option to the DNS message and sends the DNS message to a DNS server, where the first DNAI is a DNAI associated with a location of a terminal device, the DNS message is received by the EASDF from the terminal device, the DNS message includes the FQDN, and the DNS handling parameter is determined by the SMF based on deployment information of an edge application server and deployment information of a user plane function.

Based on the foregoing technical solutions, in at least one embodiment, specifically, in response to the identification information of the DNS handling information being the data network access identifier DNAI, the DNS handling parameter is the EDNS client subnet option, or the DNS handling parameter is the correspondence between the FQDN and the EDNS client subnet option. Therefore, the EASDF determines the ECS option based on the DNS handling parameter. This avoids repeated requesting and sending of information, reduces signaling interaction, and improves information processing efficiency.

With reference to the first aspect, in some implementations of the first aspect, in response to the identification information of the DNS handling information being a data network access identifier, the DNS handling information is the DNS handling parameter, and the DNS handling parameter is the local DNS server address, the first identification information is a first DNAI, the first identification information is used by the EASDF to match the first association relationship to determine the local DNS server address, and the EASDF sends the DNS message to a local DNS server, where the first DNAI is a DNAI associated with a location of a terminal device, the DNS message is received by the EASDF from the terminal device, and the DNS handling parameter is determined by the SMF based on deployment information of an edge application server and deployment information of a user plane function.

With reference to the first aspect, in some implementations of the first aspect, in response to the identification information of the DNS handling information being a data network access identifier DNAI, the DNS handling information is the DNS handling parameter, and the DNS handling parameter is a correspondence between an FQDN and the local DNS server address, the first identification information is a first DNAI, the first identification information and the DNS message are used by the EASDF to match the first association relationship to determine the local DNS server address, and the EASDF sends the DNS message to a local DNS server, where the first DNAI is a DNAI associated with a location of a terminal device, the DNS message is received by the EASDF from the terminal device, the DNS message includes the FQDN, and the DNS handling parameter is determined by the SMF based on deployment information of an edge application server and deployment information of a user plane function.

Based on the foregoing technical solutions, in at least one embodiment, specifically, in response to the identification information of the DNS handling information being the data network access identifier DNAI, the DNS handling parameter is the local DNS server address or the correspondence between the FQDN and the local DNS server address. Therefore, the EASDF determines the local DNS server address based on the DNS handling parameter. This avoids repeated requesting and sending of information, reduces signaling interaction, and improves information processing efficiency.

With reference to the first aspect, in some implementations of the first aspect, the deployment information of the edge application server includes one or more of the following types: information about an FQDN corresponding to a DNAI, information about an internet protocol address of the edge application server, and identification information of a DNS server; and the deployment information of the user plane function includes a correspondence between the user plane function UPF and the DNAI.

With reference to the first aspect, in some implementations of the first aspect, the first message further includes first indication information, where the first indication information indicates the EASDF to determine, based on the first identification information and the first association relationship, the DNS handling information corresponding to the first PDU session.

Based on the foregoing technical solution, in at least one embodiment, the first message further includes the first indication information, and an indication of the indication information enables the EASDF to determine, based on the first identification information and the first association relationship, the DNS handling information corresponding to the first PDU session. This improves information processing efficiency.

According to a second aspect, a communication method is provided. The method includes: An edge application server discovery function EASDF receives, from a session management function SMF, at least one group of first association relationships used for protocol data unit PDU sessions of a plurality of terminal devices, where the first association relationship is a correspondence between identification information of domain name system DNS handling information and the DNS handling information; the EASDF receives, from the SMF, a first message corresponding to a first PDU session, where the first message includes first identification information, the first identification information is identification information of DNS handling information corresponding to the first PDU session; and the EASDF determines, based on the first identification information and the first association relationship, the DNS handling information corresponding to the first PDU session.

According to the technical solution provided in at least one embodiment, the EASDF receives the first message and the correspondence between the identification information of the domain name system DNS handling information and the DNS handling information, and determine, based on the first identification information and the first association relationship, the DNS handling information corresponding to the first PDU session. In one aspect, the SMF sends, to the EASDF, a DNS handling rule that is based on the identification information of the DNS handling information. In this way, the EASDF uses different DNS handling information for different PDU sessions or UEs. This implements differentiated handling of DNS messages, and improves service experience of a user. In addition, the EASDF determines an ECS option and a local server address based on a DNS handling parameter. This avoids repeated requesting and sending of information, reduces signaling interaction, and improves information processing efficiency.

With reference to the second aspect, in some implementations of the second aspect, the DNS handling information includes DNS detection information or a DNS handling parameter; the DNS detection information includes a fully qualified domain name FQDN range and/or an edge application server internet protocol address range; and the DNS handling parameter is a correspondence between data network access identifier DNAI information and the EDNS client subnet option; the DNS handling parameter is a correspondence between data network access identifier DNAI information, and a fully qualified domain name FQDN and the EDNS client subnet option; the DNS handling parameter is a correspondence between data network access identifier DNAI information and the local DNS server address; or the DNS handling parameter is a correspondence between data network access identifier DNAI information, and a fully qualified domain name FQDN and the local DNS server address.

Based on the foregoing technical solution, a handling parameter in at least one embodiment is the DNS detection information or the DNS handling parameter, so that the EASDF determines, based on detection information, a handling action for the DNS message. This avoids repeated requesting and sending of information. In addition, the EASDF determines the ECS option or the local DNS server address based on the DNS handling parameter. This avoids repeated requesting and sending of information, reduces signaling interaction, and improves information processing efficiency.

With reference to the second aspect, in some implementations of the second aspect, in response to the DNS handling information being the DNS detection information, the method further includes: The EASDF receives the DNS message; the EASDF matches the DNS message based on the first identification information and the first association relationship; and the EASDF determines the handling action for the DNS message.

In at least one embodiment, the EASDF further determines, based on the first identification information and the first association relationship, the handling action for the DNS message. Specifically, the EASDF matches the DNS message based on the first identification information and the first association relationship, and the EASDF determines the handling action for the DNS message.

In at least one embodiment, the EASDF further determines, based on the first identification information and the first association relationship, the handling action for the DNS message. This avoids repeated requesting and sending of information.

With reference to the second aspect, in some implementations of the second aspect, the DNS detection information further includes information that is about a DNS message handling action performed by the EASDF and that is determined based on the first identification information, and the handling action includes one or more of the following types:

reporting the DNS message, reporting content in the DNS message, caching the DNS message, and forwarding the DNS message.

Based on the foregoing technical solution, in at least one embodiment, the DNS detection information further includes the information about the DNS message handling action performed by the EASDF, so that the EASDF determines, based on the detection information, the information about the DNS message handling action. This improves information processing efficiency.

With reference to the second aspect, in some implementations of the second aspect, in response to the DNS handling information being the DNS handling parameter, and the DNS handling parameter is a correspondence between data network access identifier DNAI information and the EDNS client subnet option, the method further includes: The EASDF receives the DNS message; the EASDF matches the DNS message based on the first identification information and the first association relationship; the EASDF determines the EDNS client subnet option by matching the DNS message; and the EASDF adds the determined EDNS client subnet option to the DNS message, and sends the DNS message to a DNS server.

With reference to the second aspect, in some implementations of the second aspect, in response to the DNS handling information being the DNS handling parameter, and the DNS handling parameter is a correspondence between data network access identifier DNAI information, and a fully qualified domain name FQDN and the EDNS client subnet option, the method further includes: The EASDF receives the DNS message; the EASDF matches the DNS message based on the first identification information and the first association relationship; the EASDF determines the EDNS client subnet option by matching the DNS message; and the EASDF adds the determined EDNS client subnet option to the DNS message, and sends the DNS message to a DNS server.

With reference to the second aspect, in some implementations of the second aspect, in response to the DNS handling information being the DNS handling parameter, and the DNS handling parameter is a correspondence between data network access identifier DNAI information and the local DNS server address, the method further includes: The EASDF receives the DNS message; the EASDF matches the DNS message based on the first identification information and the first association relationship; the EASDF determines the local DNS server address by matching the DNS message; and the EASDF sends the DNS message to a local DNS server.

With reference to the second aspect, in some implementations of the second aspect, in response to the DNS handling information being the DNS handling parameter, and the DNS handling parameter is a correspondence between data network access identifier DNAI information, and a fully qualified domain name FQDN and the local DNS server address, the method further includes: The EASDF receives the DNS message; the EASDF matches the DNS message based on the first identification information and the first association relationship; the EASDF determines the local DNS server address by matching the DNS message; and the EASDF sends the DNS message to a local DNS server.

Based on the foregoing technical solution, in at least one embodiment, the EASDF determines the ECS option or the local DNS server based on the DNS handling parameter. This avoids repeated requesting and sending of information, reduces signaling interaction, and improves information processing efficiency.

With reference to the second aspect, in some implementations of the second aspect, in response to the identification information of the DNS handling information being the data network access identifier DNAI, the DNS handling information is the DNS handling parameter, the DNS handling parameter is the EDNS client subnet option, and the first identification information is a first DNAI, the method further includes: The EASDF receives the DNS message from a terminal device; the EASDF matches the first association relationship based on the first identification information; the EASDF determines the EDNS client subnet option by matching the first association relationship; and the EASDF adds the determined EDNS client subnet option to the DNS message, and sends the DNS message to a DNS server, where the first DNAI is a DNAI associated with a location of the terminal device.

With reference to the second aspect, in some implementations of the second aspect, in response to the identification information of the DNS handling information being the data network access identifier DNAI, the DNS handling information is the DNS handling parameter, the DNS handling parameter is a correspondence between a fully qualified domain name FQDN and the EDNS client subnet option, and the first identification information is a first DNAI, the method further includes: The EASDF receives the DNS message from a terminal device; the EASDF matches the first association relationship based on the first identification information and the DNS message; the EASDF determines the EDNS client subnet option by matching the first association relationship; and the EASDF adds the determined EDNS client subnet option to the DNS message, and sends the DNS message to a DNS server.

Based on the foregoing technical solutions, in at least one embodiment, specifically, in response to the identification information of the DNS handling information being the data network access identifier DNAI, the DNS handling parameter is the EDNS client subnet option, or the DNS handling parameter is the correspondence between the FQDN and the EDNS client subnet option. Therefore, the EASDF determines the ECS option based on the DNS handling parameter. This avoids repeated requesting and sending of information, reduces signaling interaction, and improves information processing efficiency.

With reference to the second aspect, in some implementations of the second aspect, in response to the identification information of the DNS handling information being the data network access identifier, the DNS handling information is the DNS handling parameter, the DNS handling parameter is the local DNS server address, and the first identification information is a first DNAI, the method further includes: The EASDF receives a DNS message from a terminal device; the EASDF matches the first association relationship based on the first identification information; the EASDF determines the local DNS server address by matching the first association relationship; and the EASDF sends the DNS message to a local DNS server, where the first DNAI is a DNAI associated with a location of the terminal device.

With reference to the second aspect, in some implementations of the second aspect, in response to the identification information of the DNS handling information being the data network access identifier DNAI, the DNS handling information is the DNS handling parameter, and the DNS handling parameter is a correspondence between a fully qualified domain name FQDN and the DNS handling parameter, and the first identification information is a first DNAI, the method further includes: The EASDF receives the DNS message from a terminal device; the EASDF matches the first association relationship based on the first identification information and the DNS message; the EASDF determines the local DNS server address by matching the first association relationship; and the EASDF sends the DNS message to a local DNS server.

Based on the foregoing technical solutions, in at least one embodiment, specifically, in response to the identification information of the DNS handling information being the data network access identifier DNAI, the DNS handling parameter is the local DNS server address or the correspondence between the FQDN and the local DNS server address. Therefore, the EASDF determines the local DNS server address based on the DNS handling parameter. This avoids repeated requesting and sending of information, reduces signaling interaction, and improves information processing efficiency.

With reference to the second aspect, in some implementations of the second aspect, the DNS handling parameter is determined by the SMF based on deployment information of an edge application server and deployment information of a user plane function; the deployment information of the edge application server includes one or more of the following types: information about an FQDN corresponding to a DNAI, information about an internet protocol address of the edge application server, and identification information of a DNS server; and the deployment information of the user plane function includes a correspondence between the user plane function UPF and the DNAI.

In at least one embodiment, the deployment information of the user plane function further includes a correspondence between the DNAI and the ECS option.

With reference to the first aspect, in some implementations of the first aspect, the first message further includes first indication information, where the first indication information indicates the EASDF to determine, based on the first identification information and the first association relationship, the DNS handling information corresponding to the first PDU session.

Based on the foregoing technical solution, in at least one embodiment, the first message further includes the first indication information, and an indication of the indication information enables the EASDF to determine, based on the first identification information and the first association relationship, the DNS handling information corresponding to the first PDU session. This improves information processing efficiency.

According to a third aspect, a communication method is provided. The method includes: A first network element obtains at least one group of second association relationships, where the second association relationship is a correspondence between device group identifier information and deployment information of an edge application server; and the first network element sends, to a session management function SMF, the at least one group of second association relationships.

With reference to the third aspect, in some implementations of the third method aspect, the deployment information of the edge application server includes one or more of the following types: information about a fully qualified domain name FQDN corresponding to a data network access identifier DNAI, information about an internet protocol address of the edge application server, and identification information of a domain name system DNS server.

With reference to the third aspect, in some implementations of the third method aspect, the first network element is a unified data repository UDR or a unified data management UDM.

Based on the foregoing technical solutions, in at least one embodiment, the UDR or the UDM sends the at least one group of second association relationships to the SMF, so that the SMF subsequently determines a first association relationship based on the second association relationships and UPF deployment information. This improves flexibility of information processing.

According to a fourth aspect, a communication system is provided. The system includes a session management function SMF and an edge application server discovery function EASDF. The SMF is configured to: obtain at least one group of first association relationships, where the first association relationship is a correspondence between identification information of domain name system DNS handling information and the DNS handling information; send, to the edge application server discovery function EASDF, the at least one group of first association relationships used for protocol data unit PDU sessions of a plurality of terminal devices; and send, to the EASDF, a first message corresponding to a first PDU session, where the first message includes first identification information, and the first identification information is identification information of DNS handling information corresponding to the first PDU session. The EASDF is configured to: receive the at least one group of first association relationships used for the PDU sessions of the plurality of terminal devices and the first message corresponding to the first PDU session, and determine, based on the first identification information and the first association relationship, the DNS handling information corresponding to the first PDU session.

According to the technical solution provided in at least one embodiment, the SMF sends, to the EASDF, the first message and the correspondence between the identification information of the domain name system DNS handling information and the DNS handling information, so that the EASDF receives the first message and the correspondence between the identification information of the domain name system DNS handling information and the DNS handling information, and the EASDF determines, based on the first identification information and the first association relationship, the DNS handling information corresponding to the first PDU session. In one aspect, the SMF sends, to the EASDF, a DNS handling rule that is based on the identification information of the DNS handling information. In this way, the EASDF uses different DNS handling information for different PDU sessions or UEs. This implements differentiated handling of DNS messages, and improves service experience of a user. In addition, the EASDF determines an ECS option and a local server address based on a DNS handling parameter. This avoids repeated requesting and sending of information, reduces signaling interaction, and improves information processing efficiency.

With reference to the fourth aspect, in some implementations of the fourth aspect, the DNS handling information includes DNS detection information or a DNS handling parameter; the DNS detection information includes a fully qualified domain name FQDN range and/or an edge application server internet protocol address range; and the DNS handling parameter is a correspondence between data network access identifier DNAI information and the EDNS client subnet option; the DNS handling parameter is a correspondence between data network access identifier DNAI information, and a fully qualified domain name FQDN and the EDNS client subnet option; the DNS handling parameter is a correspondence between data network access identifier DNAI information and the local DNS server address; or the DNS handling parameter is a correspondence between data network access identifier DNAI information, and a fully qualified domain name FQDN and the local DNS server address.

With reference to the fourth aspect, in some implementations of the fourth aspect, in response to the DNS handling information being the DNS detection information, the EASDF is specifically configured to: receive the DNS message; match the DNS message based on the first identification information and the first association relationship; and determine a handling action for the DNS message.

With reference to the fourth aspect, in some implementations of the fourth aspect, the DNS detection information further includes information that is about a DNS message handling action performed by the EASDF and that is determined based on the first identification information, and the handling action includes one or more of the following types: reporting the DNS message, reporting content in the DNS message, caching the DNS message, and forwarding the DNS message.

With reference to the fourth aspect, in some implementations of the fourth aspect, in response to the DNS handling information being the DNS handling parameter, and the DNS handling parameter is the correspondence between the data network access identifier DNAI information and the EDNS client subnet option, the EASDF is specifically configured to: receive the DNS message; match the DNS message based on the first identification information and the first association relationship; determine the EDNS client subnet option by matching the DNS message; and add the determined EDNS client subnet option to the DNS message, and sends the DNS message to a DNS server.

With reference to the fourth aspect, in some implementations of the fourth aspect, in response to the DNS handling information being the DNS handling parameter, and the DNS handling parameter being the correspondence between the data network access identifier DNAI information, and the fully qualified domain name FQDN and the EDNS client subnet option, the EASDF is specifically configured to: receive the DNS message; match the DNS message based on the first identification information and the first association relationship; determine the EDNS client subnet option by matching the DNS message; and add the determined EDNS client subnet option to the DNS message, and sends the DNS message to a DNS server.

With reference to the fourth aspect, in some implementations of the fourth aspect, in response to the DNS handling information being the DNS handling parameter, and the DNS handling parameter is the correspondence between the data network access identifier DNAI information and the local DNS server address, the EASDF is specifically configured to: receive the DNS message; match the DNS message based on the first identification information and the first association relationship; determine the local DNS server address by matching the DNS message; and send the DNS message to a local DNS server.

With reference to the fourth aspect, in some implementations of the fourth aspect, in response to the DNS handling information being the DNS handling parameter, the DNS handling information is the DNS handling parameter, and the DNS handling parameter is the correspondence between the data network access identifier DNAI information, the fully qualified domain name FQDN, and the local DNS server address, the EASDF is specifically configured to: receive the DNS message; match the DNS message based on the first identification information and the first association relationship; determine the local DNS server address by matching the DNS message; and send the DNS message to a local DNS server.

With reference to the fourth aspect, in some implementations of the fourth aspect, the SMF is further configured to determine the DNS handling parameter based on deployment information of an edge application server and deployment information of a user plane function.

With reference to the fourth aspect, in some implementations of the fourth aspect, the deployment information of the edge application server includes one or more of the following types: information about an FQDN corresponding to a DNAI, information about an internet protocol address of the edge application server, and identification information of a DNS server; and the deployment information of the user plane function includes a correspondence between the user plane function UPF and the DNAI.

With reference to the fourth aspect, in some implementations of the fourth aspect, in response to the identification information of the DNS handling information being the data network access identifier DNAI, the DNS handling information is the DNS handling parameter, and the DNS handling parameter is the EDNS client subnet option, the first identification information is a first DNAI, and the EASDF is specifically configured to: receive the DNS message from a terminal device; match the first association relationship based on the first identification information; determine the EDNS client subnet option by matching the first association relationship; and add the determined EDNS client subnet option to the DNS message, and send the DNS message to a DNS server, where the first DNAI is a DNAI associated with a location of the terminal device.

With reference to the fourth aspect, in some implementations of the fourth aspect, in response to the identification information of the DNS handling information being the data network access identifier DNAI, the DNS handling information is the DNS handling parameter, and the DNS handling parameter is the correspondence between the fully qualified domain name FQDN and the EDNS client subnet option, the first identification information is a first DNAI, and the EASDF is specifically configured to: receive the DNS message from a terminal device; match the first association relationship based on the first identification information and the DNS message; determine the EDNS client subnet option by matching the first association relationship; and add the determined EDNS client subnet option to the DNS message, and send the DNS message to a DNS server, where the first DNAI is a DNAI associated with a location of the terminal device.

With reference to the fourth aspect, in some implementations of the fourth aspect, in response to the identification information of the DNS handling information being the data network access identifier, the DNS handling information is the DNS handling parameter, and the DNS handling parameter is the local DNS server address, the first identification information is a first DNAI, and the EASDF is specifically configured to: receive the DNS message from a terminal device; match the first association relationship based on the first identification information; determine the local DNS server address by matching the first association relationship; and send the DNS message to a local DNS server, where the first DNAI is a DNAI associated with a location of the terminal device.

With reference to the fourth aspect, in some implementations of the fourth aspect, in response to the identification information of the DNS handling information being the data network access identifier DNAI, the DNS handling information is the DNS handling parameter, and the DNS handling parameter is the correspondence between the fully qualified domain name FQDN and the DNS handling parameter, the first identification information is a first DNAI, and the EASDF is specifically configured to: receive the DNS message from a terminal device; match the first association relationship based on the first identification information and the DNS message; determine the local DNS server address by matching the first association relationship; and sends the DNS message to a local DNS server.

With reference to the fourth aspect, in some implementations of the fourth aspect, the system further includes a first network element, where the first network element is a unified data repository UDR or a unified data management UDM, and the first network element is configured to: obtain at least one group of second association relationships, where the second association relationship is a correspondence between device group identification information and deployment information of an edge application server; and send the second association relationships to the SMF. The SMF is configured to receive the at least one group of second association relationships.

With reference to the fourth aspect, in some implementations of the fourth aspect, the first message further includes first indication information, where the first indication information indicates the EASDF to determine, based on the first identification information and the first association relationship, the DNS handling information corresponding to the first PDU session.

According to a fifth aspect, an apparatus is provided. The apparatus is an SMF. The apparatus alternatively is a chip. The apparatus has a function of implementing the SMF in an implementation of the first aspect. The function is implemented by hardware, or is implemented by hardware executing corresponding software. The hardware or the software includes one or more modules or units corresponding to the foregoing functions.

The apparatus includes a transceiver unit and a processing unit. The processing unit is configured to obtain at least one group of first association relationships, where the first association relationship is a correspondence between identification information of domain name system DNS handling information and the DNS handling information. The transceiver unit is configured to send the at least one group of first association relationships used for protocol data unit PDU sessions of a plurality of terminal devices. The transceiver unit is configured to send a first message corresponding to a first PDU session, where the first message includes first identification information, the first identification information is identification information of DNS handling information corresponding to the first PDU session, and the first identification information is used by an EASDF to determine, based on the first identification information and the first association relationship, DNS handling information corresponding to the first PDU session.

With reference to the fifth aspect, in some implementations of the fifth aspect, the DNS handling information includes DNS detection information or a DNS handling parameter; the DNS detection information is used by the EASDF to match a DNS message to determine a handling action for the DNS message; and the DNS handling parameter is used by the EASDF to match a DNS message to determine an EDNS client subnet option, so that the EASDF adds the EDNS client subnet option to the DNS message and sends the DNS message to a DNS server; or the DNS handling parameter is used by the EASDF to match a DNS message to determine a local DNS server address, and the EASDF sends the DNS message to a local DNS server, where the DNS message is received by the EASDF from a terminal device or a DNS server.

With reference to the fifth aspect, in some implementations of the fifth aspect, in response to the DNS handling information being the DNS detection information, the DNS detection information includes a fully qualified domain name FQDN range and/or an edge application server internet protocol address range.

With reference to the fifth aspect, in some implementations of the fifth aspect, the DNS detection information further includes information that is about a DNS message handling action performed by the EASDF and that is determined based on the first identification information, and the handling action includes one or more of the following types: reporting the DNS message, reporting content in the DNS message, caching the DNS message, and forwarding the DNS message.

With reference to the fifth aspect, in some implementations of the fifth aspect, in response to the DNS handling information being the DNS handling parameter, the DNS handling parameter is a correspondence between data network access identifier DNAI information and the EDNS client subnet option, or the DNS handling parameter is a correspondence between data network access identifier DNAI information, and a fully qualified domain name FQDN and the EDNS client subnet option, or the DNS handling parameter is a correspondence between data network access identifier DNAI information and the local DNS server address, or the DNS handling parameter is a correspondence between data network access identifier DNAI information, and a fully qualified domain name FQDN and the local DNS server address, where the DNS handling parameter is determined by the SMF based on deployment information of an edge application server and deployment information of a user plane function.

With reference to the fifth aspect, in some implementations of the fifth aspect, in response to the identification information of the DNS handling information being the data network access identifier DNAI, the DNS handling information is the DNS handling parameter, and the DNS handling parameter is the EDNS client subnet option, the first identification information is a first DNAI, and the first identification information is used by the EASDF to match the first association relationship to determine the EDNS client subnet option, so that the EASDF adds the EDNS client subnet option to a DNS message and sends the DNS message to a DNS server, where the first DNAI is DNAI associated with a location of a terminal device, the DNS message is received by the EASDF from the terminal device, and the DNS handling parameter is determined by the SMF based on deployment information of an edge application server and deployment information of a user plane function.

With reference to the fifth aspect, in some implementations of the fifth aspect, in response to the identification information of the DNS handling information being the data network access identifier DNAI, the DNS handling information is the DNS handling parameter, and the DNS handling parameter is a correspondence between a fully qualified domain name FQDN and the EDNS client subnet option, the first identification information is a first DNAI, and the first identification information and the DNS message are used by the EASDF to match the first association relationship to determine the EDNS client subnet option, so that the EASDF adds the EDNS client subnet option to the DNS message and sends the DNS message to a DNS server, where the first DNAI is a DNAI associated with a location of a terminal device, the DNS message is received by the EASDF from the terminal device, and the DNS handling parameter is determined by the SMF based on deployment information of an edge application server and deployment information of a user plane function.

With reference to the fifth aspect, in some implementations of the fifth aspect, in response to the identification information of the DNS handling information being the data network access identifier, the DNS handling information is the DNS handling parameter, and the DNS handling parameter is the local DNS server address, the first identification information is a first DNAI, the first identification information is used by the EASDF to match the first association relationship to determine the local DNS server address, and the EASDF sends the DNS message to a local DNS server, where the first DNAI is a DNAI associated with a location of a terminal device, the DNS message is received by the EASDF from the terminal device, and the DNS handling parameter is determined by the SMF based on deployment information of an edge application server and deployment information of a user plane function.

With reference to the fifth aspect, in some implementations of the fifth aspect, in response to the identification information of the DNS handling information being the data network access identifier DNAI, the DNS handling information is the DNS handling parameter, and the DNS handling parameter is a correspondence between a fully qualified domain name FQDN and the DNS handling parameter, the first identification information is a first DNAI, the first identification information and the DNS message are used by the EASDF to match the first association relationship to determine the local DNS server address, and the EASDF sends the DNS message to a local DNS server, where the first DNAI is a DNAI associated with a location of a terminal device, the DNS message is received by the EASDF from the terminal device, and the DNS handling parameter is determined by the SMF based on deployment information of an edge application server and deployment information of a user plane function.

With reference to the fifth aspect, in some implementations of the fifth aspect, the deployment information of the edge application server includes one or more of the following types: information about an FQDN corresponding to a DNAI, information about an internet protocol address of the edge application server, and identification information of a DNS server; and the deployment information of the user plane function includes a correspondence between the user plane function UPF and the DNAI.

With reference to the fifth aspect, in some implementations of the fifth aspect, the first message further includes first indication information, where the first indication information indicates the EASDF to determine, based on the first identification information and the first association relationship, the DNS handling information corresponding to the first PDU session.

According to a sixth aspect, a communication apparatus is provided, and the apparatus is an EASDF. The apparatus alternatively is a chip. The apparatus has a function of implementing the EASDF in an implementation of the second aspect. The function is implemented by hardware, or is implemented by hardware executing corresponding software. The hardware or the software includes one or more modules or units corresponding to the foregoing functions.

The apparatus includes a transceiver unit and a processing unit. The transceiver unit is configured to receive at least one group of first association relationships used for protocol data unit PDU sessions of a plurality of terminal devices, where the first association relationship is a correspondence between identification information of domain name system DNS handling information and the DNS handling information. The transceiver unit is configured to receive a first message, where the first message includes first identification information, the first identification information is identification information of DNS handling information corresponding to a first PDU session. The processing unit is configured to determine, based on the first identification information and the first association relationship, DNS handling information corresponding to the first PDU session.

With reference to the sixth aspect, in some implementations of the sixth aspect, the DNS handling information includes DNS detection information or a DNS handling parameter. The DNS detection information includes a fully qualified domain name FQDN range and/or an edge application server internet protocol address range; and the DNS handling parameter is a correspondence between data network access identifier DNAI information and an EDNS client subnet option; the DNS handling parameter is a correspondence between data network access identifier DNAI information, and a fully qualified domain name FQDN and an EDNS client subnet option; the DNS handling parameter is a correspondence between data network access identifier DNAI information and a local DNS server address; or the DNS handling parameter is a correspondence between data network access identifier DNAI information, and a fully qualified domain name FQDN and a local DNS server address.

With reference to the sixth aspect, in some implementations of the sixth aspect, in response to the DNS handling information being the DNS detection information, the transceiver unit is configured to receive a DNS message; the processing unit is configured to match the DNS message based on the first identification information and the first association relationship; and the processing unit is configured to determine a handling action for the DNS message.

With reference to the sixth aspect, in some implementations of the sixth aspect, the DNS detection information further includes information that is about a DNS message handling action performed by the EASDF and that is determined based on the first identification information, and the handling action includes one or more of the following: reporting the DNS message, reporting content in the DNS message, caching the DNS message, and forwarding the DNS message.

With reference to the sixth aspect, in some implementations of the sixth aspect, in response to the DNS handling information being the DNS handling parameter, and the DNS handling parameter is a correspondence between data network access identifier DNAI information and the EDNS client subnet option, the transceiver unit is configured to receive the DNS message; the processing unit is configured to match the DNS message based on the first identification information and the first association relationship; the processing unit is configured to determine the EDNS client subnet option by matching the DNS message; and the processing unit is configured to add the determined EDNS client subnet option to the DNS message, and the transceiver unit is configured to send, to a DNS server, the DNS message to which the EDNS client subnet option is added.

With reference to the sixth aspect, in some implementations of the sixth aspect, in response to the DNS handling information being the DNS handling parameter, and the DNS handling parameter is a correspondence between data network access identifier DNAI information, and a fully qualified domain name FQDN and the EDNS client subnet option, the transceiver unit is configured to receive the DNS message; the processing unit is configured to match the DNS message based on the first identification information and the first association relationship; the processing unit is configured to determine the EDNS client subnet option by matching the DNS message; and the processing unit is configured to add the determined EDNS client subnet option to the DNS message, and the transceiver unit is configured to send, to a DNS server, the DNS message to which the EDNS client subnet option is added.

With reference to the sixth aspect, in some implementations of the sixth aspect, in response to the DNS handling information being the DNS handling parameter, and the DNS handling parameter is a correspondence between data network access identifier DNAI information and the local DNS server address, the transceiver unit is configured to receive the DNS message; the processing unit is configured to match the DNS message based on the first identification information and the first association relationship; the processing unit is configured to determine the local DNS server address by matching the DNS message; and the transceiver unit is configured to send the DNS message to a local DNS server.

With reference to the sixth aspect, in some implementations of the sixth aspect, in response to the DNS handling information being the DNS handling parameter, and the DNS handling parameter is a correspondence between data network access identifier DNAI information, and a fully qualified domain name FQDN and the local DNS server address, the transceiver unit is configured to receive the DNS message; the processing unit is configured to match the DNS message based on the first identification information and the first association relationship; the processing unit is configured to determine the local DNS server address by matching the DNS message; and the processing unit is configured to send the DNS message to a local DNS server.

With reference to the sixth aspect, in some implementations of the sixth aspect, in response to the identification information of the DNS handling information being the data network access identifier DNAI, the DNS handling information is the DNS handling parameter, and the DNS handling parameter is the EDNS client subnet option, the first identification information is a first DNAI, and the transceiver unit is configured to receive the DNS message from a terminal device; the processing unit is configured to match the first association relationship based on the first identification information; the processing unit is configured to determine the EDNS client subnet option by matching the first association relationship; and the processing unit is configured to add the determined EDNS client subnet option to the DNS message, and the transceiver unit is configured to send, to a DNS server, the DNS message to which the EDNS client subnet option is added, where the first DNAI is a DNAI associated with a location of the terminal device.

With reference to the sixth aspect, in some implementations of the sixth aspect, in response to the identification information of the DNS handling information being the data network access identifier DNAI, the DNS handling information is the DNS handling parameter, and the DNS handling parameter is a correspondence between a fully qualified domain name FQDN and the EDNS client subnet option, the first identification information is a first DNAI, and the transceiver unit is configured to receive the DNS message from a terminal device; the processing unit is configured to match the first association relationship based on the first identification information and the DNS message; the processing unit is configured to determine the EDNS client subnet option by matching the first association relationship; the processing unit is configured to: add the determined EDNS client subnet option to the DNS message, and send the DNS message to a DNS server; and the transceiver unit is configured to send, to a DNS server, the DNS message to which the EDNS client subnet option is added, where the first DNAI is a DNAI associated with a location of the terminal device.

With reference to the sixth aspect, in some implementations of the sixth aspect, in response to the identification information of the DNS handling information being the data network access identifier, the DNS handling information is the DNS handling parameter, and the DNS handling parameter is the local DNS server address, the first identification information is a first DNAI, and the transceiver unit is configured to receive the DNS message from a terminal device; the processing unit is configured to match the first association relationship based on the first identification information; the processing unit is configured to determine the local DNS server address by matching the first association relationship; and the processing unit is configured to send the DNS message to a local DNS server, where the first DNAI is a DNAI associated with a location of the terminal device.

With reference to the sixth aspect, in some implementations of the sixth aspect, in response to the identification information of the DNS handling information being a data network access identifier DNAI, the DNS handling information is the DNS handling parameter, and the DNS handling parameter is a correspondence between a fully qualified domain name FQDN and the DNS handling parameter, the first identification information is a first DNAI, and the transceiver unit is configured to receive the DNS message from a terminal device; the processing unit is configured to match the first association relationship based on the first identification information and the DNS message; the processing unit is configured to determine the local DNS server address by matching the first association relationship; and the processing unit is configured to send the DNS message to a local DNS server.

With reference to the sixth aspect, in some implementations of the sixth aspect, the DNS handling parameter is determined by the SMF based on deployment information of an edge application server and deployment information of a user plane function; the deployment information of the edge application server includes one or more of the following types: information about an FQDN corresponding to a DNAI, information about an internet protocol address of the edge application server, and identification information of a DNS server; and the deployment information of the user plane function includes a correspondence between the user plane function UPF and the DNAI.

With reference to the sixth aspect, in some implementations of the sixth aspect, the first message further includes first indication information, where the first indication information indicates the EASDF to determine, based on the first identification information and the first association relationship, the DNS handling information corresponding to the first PDU session.

According to a seventh aspect, a communication apparatus is provided. The apparatus is a first network element, for example, a UDR or a UDM. The apparatus alternatively is a chip. The apparatus has a function of implementing the first network element in an implementation of the third aspect. The function is implemented by hardware, or is implemented by hardware executing corresponding software. The hardware or the software includes one or more modules or units corresponding to the foregoing functions.

The apparatus includes a transceiver unit and a processing unit. The processing unit is configured to obtain at least one group of second association relationships, where the second association relationship is a correspondence between device group identification information and deployment information of an edge application server. The transceiver unit is configured to send the second association relationships.

With reference to the seventh aspect, in some implementations of the seventh aspect, the deployment information of the edge application server includes one or more of the following types: information about a fully qualified domain name FQDN corresponding to a data network access identifier DNAI, information about an internet protocol address of the edge application server, and identification information of a domain name system DNS server.

According to an eighth aspect, a communication apparatus is provided, and includes a processor. The processor is coupled to a memory, and is configured to execute instructions in the memory, to implement a function of the SMF in an implementation of the first aspect. Optionally, the apparatus further includes the memory. Optionally, the apparatus further includes a communication interface, and the processor is coupled to the communication interface.

In an implementation, the apparatus is an SMF. In response to the apparatus being the SMF, the communication interface is a transceiver or an input/output interface.

In another implementation, the apparatus is a chip configured in an SMF. In response to the apparatus being the chip configured in the SMF, the communication interface is an input/output interface.

Optionally, the transceiver is a transceiver circuit. Optionally, the input/output interface is an input/output circuit.

According to a ninth aspect, a communication apparatus is provided, and includes a processor. The processor is coupled to a memory, and is configured to execute instructions in the memory, to implement a function of the EASDF in an implementation of the second aspect. Optionally, the apparatus further includes the memory. Optionally, the apparatus further includes a communication interface, and the processor is coupled to the communication interface.

In an implementation, the apparatus is an EASDF. In response to the apparatus being the EASDF, the communication interface is a transceiver or an input/output interface.

In another implementation, the apparatus is a chip configured in an EASDF. In response to the apparatus being the chip configured in the EASDF, the communication interface is an input/output interface.

Optionally, the transceiver is a transceiver circuit. Optionally, the input/output interface is an input/output circuit.

According to a tenth aspect, a communication apparatus is provided, and includes a processor. The processor is coupled to a memory, and is configured to execute instructions in the memory, to implement a function of the first network element in an implementation of the third aspect. For example, the apparatus is a UDR or a UDM. Optionally, the apparatus further includes the memory. Optionally, the apparatus further includes a communication interface, and the processor is coupled to the communication interface.

In an implementation, the apparatus is a first network element. In response to the apparatus being the first network element, the communication interface is a transceiver or an input/output interface.

In another implementation, the apparatus is a chip configured in a first network element. In response to the apparatus being the chip configured in the first network element, the communication interface is an input/output interface.

Optionally, the transceiver is a transceiver circuit. Optionally, the input/output interface is an input/output circuit.

According to an eleventh aspect, a processor is provided, and includes an input circuit, an output circuit, and a processing circuit. The processing circuit is configured to: receive a signal via the input circuit, and transmit a signal via the output circuit, to enable the processor to perform the method in any one of the first aspect to the third aspect.

In a specific implementation process, the processor is a chip, the input circuit is an input pin, the output circuit is an output pin, and the processing circuit is a transistor, a gate circuit, a trigger, various logic circuits, or the like. An input signal received by the input circuit is received and input by, for example, but not limited to, a receiver, a signal output by the output circuit is output to, for example, but not limited to, a transmitter and transmitted by the transmitter, and the input circuit and the output circuit is a same circuit, where the circuit is used as the input circuit and the output circuit at different moments. Specific implementations of the processor and the various circuits are not limited in at least one embodiment.

According to a twelfth aspect, an apparatus is provided, and includes a processor and a memory. The processor is configured to: read instructions stored in the memory, receive a signal by using a receiver, and transmit a signal by using a transmitter, to perform the method in any one of the first aspect to the third aspect.

Optionally, there are one or more processors, and there are one or more memories.

Optionally, the memory is integrated with the processor, or the memory and the processor are separately disposed.

In a specific implementation process, the memory is a non-transitory (non-transitory) memory, such as a read-only memory (read-only memory, ROM). The memory and the processor are integrated into one chip, or is separately disposed in different chips. A type of the memory and a manner in which the memory and the processor are disposed are not limited in at least one embodiment.

A related data exchange process such as sending of indication information is a process of outputting the indication information from the processor, and receiving of capability information is a process of receiving input capability information by the processor. Specifically, data output by the processor is output to a transmitter, and input data received by the processor is from a receiver. The transmitter and the receiver are collectively referred to as a transceiver.

The apparatus in the twelfth aspect is a chip. The processor is implemented by using hardware or software. In response to the processor being implemented by using hardware, the processor is a logic circuit, an integrated circuit, or the like. Alternatively, in response to the processor being implemented by using software, the processor is a general-purpose processor, and is implemented by reading software code stored in the memory. The memory is integrated into the processor, or exists independently outside the processor.

According to a thirteenth aspect, a computer program product is provided. The computer program product includes a computer program (which is also referred to as code or instructions), and in response to the computer program being run, the computer is enabled to perform the method in any one of the first aspect to the third aspect.

According to a fourteenth aspect, a computer-readable medium is provided. The computer-readable medium stores a computer program (which is also referred to as code or instructions), and in response to the computer program running on a computer, the computer is enabled to perform the method in any one of the first aspect to the third aspect.

According to a fifteenth aspect, a chip system is provided, including a processor, configured to invoke a computer program from a memory and run the computer program, to enable a device installed with the chip system to perform the method in any one of the first aspect to the third aspect.

According to a sixteenth aspect, a system is provided. The system includes the apparatus in the fifth aspect, the apparatus in the sixth aspect, and the apparatus in the seventh aspect.

DESCRIPTION OF EMBODIMENTS

The following describes technical solutions of at least one embodiment with reference to accompanying drawings.

A wireless communication system mentioned in at least one embodiment includes but is not limited to a global system for mobile communications (global system for mobile communications, GSM) system, a long term evolution (long term evolution, LTE) frequency division duplex (frequency division duplex, FDD) system, an LTE time division duplex (time division duplex, TDD) system, an LTE system, a long term evolution-advanced (LTE-Advanced, LTE-A) system, a next-generation communication system (for example, a 6G communication system), a system integrating a plurality of access systems, or an evolved system. The technical solutions provided in at least one embodiment is further applied to machine type communication (machine type communication, MTC), machine-to-machine communication long term evolution technology (Long Term Evolution-machine, LTE-M), a device-to-device (device to device, D2D) network, a machine-to-machine (machine to machine, M2M) network, an internet of things (internet of things, IoT) network, or another network. The IoT network includes, for example, an internet of vehicles. Communication manners in an internet of vehicles system are collectively referred to as vehicle to X (vehicle to X, V2X, where X represents anything). For example, V2X includes vehicle to vehicle (vehicle to vehicle, V2V) communication, vehicle to infrastructure (vehicle to infrastructure, V2I) communication, vehicle to pedestrian (vehicle to pedestrian, V2P) communication, or vehicle to network (vehicle to network, V2N) communication.

Figure 1:
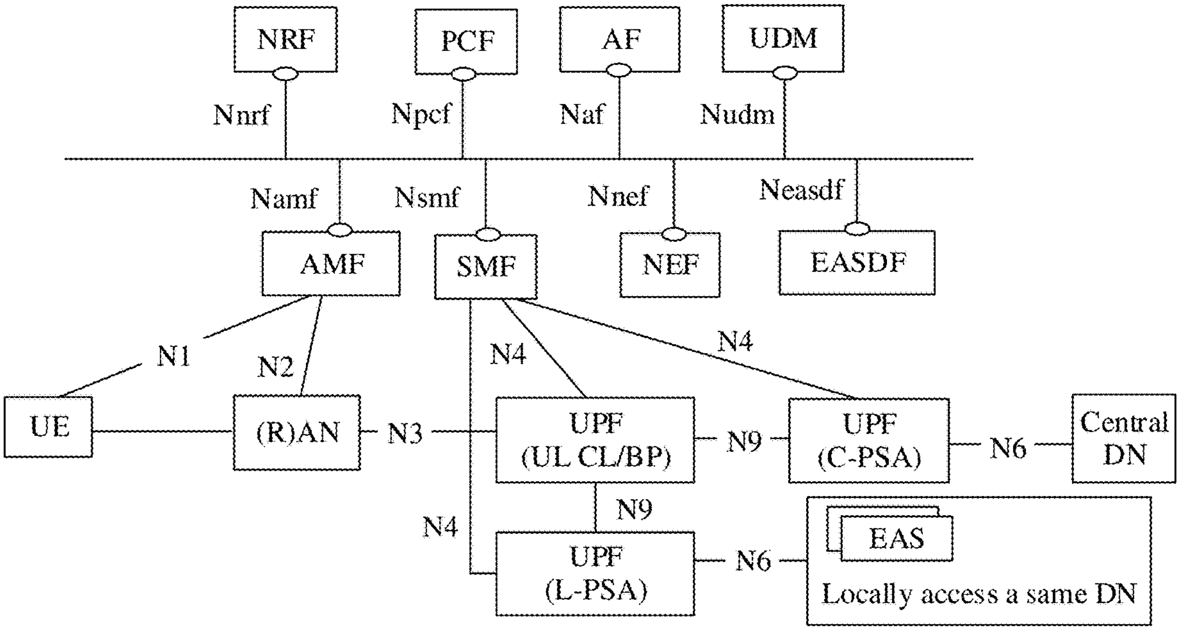
FIG. 1 is a diagram of a system architecture according to at least one embodiment.

With reference to FIG. 1, the following describes in detail a network system architecture related to at least one embodiment.

FIG. 1 is a diagram of a system architecture according to at least one embodiment. As shown in the figure, the network architecture specifically includes the following network elements.

1. Radio access network (radio access network, RAN): An access network that implements a network access function based on a wireless communication technology is referred to as a radio access network. The radio access network manages radio resources, provides an access service for a terminal, and further completes forwarding of a control signal and user data between the terminal and a core network.

A radio access network device involved in at least one embodiment is a device with a wireless transceiver function. The radio access network device is a device that provides a wireless communication function service, is usually located on a network side, and includes but is not limited to a next generation NodeB (gNodeB, gNB) in a 5th generation (5th generation, 5G) communication system, a next generation NodeB in a 6th generation (6th generation, 6G) mobile communication system, a base station in a future mobile communication system, an access node in a Wi-Fi system, an evolved NodeB (evolved NodeB, eNB) in an LTE system, a radio network controller (radio network controller, RNC), a NodeB (NodeB, NB), a base station controller (base station controller, BSC), a home NodeB (for example, a home evolved NodeB or a home NodeB, HNB), a baseband unit (base band unit, BBU), a transmission reception point (transmission reception point, TRP), a transmission point (transmitting point, TP), and a base transceiver station (base transceiver station, BTS). In a network structure, the access network device includes a central unit (central unit, CU) node, a distributed unit (distributed unit, DU) node, a RAN device including a CU node and a DU node, or a RAN device including a CU-control plane node, a CU-user plane node, and a DU node. The access network device serves a cell, and user equipment communicates with a base station by using a transmission resource (for example, a frequency domain resource or a frequency spectrum resource) used by the cell. The cell is a cell corresponding to the base station (for example, a base station). The cell belongs to a macro base station or a base station corresponding to a small cell (small cell). The small cell herein includes a metro cell (metro cell), a micro cell (micro cell), a pico cell (pico cell), a femto cell (femto cell), or the like. These small cells have features of small coverage and low transmit power, and are applicable to a data transmission service that provides high speed. The radio access network device is a macro base station, is a micro base station or an indoor base station, or is a relay node or a donor node, a device that provides a wireless communication service for user equipment in a V2X communication system, a radio controller in a cloud radio access network (cloud radio access network, CRAN) scenario, a relay station, a vehicle-mounted device, a wearable device, a network device in a future evolved network, or the like. A specific technology and a specific device form that are used by the radio access network device are not limited in at least one embodiment.

2. User equipment (user equipment, UE): UE in at least one embodiment is a network terminal device, such as a mobile phone or an internet of things terminal device. Specifically, for example, a terminal device is user equipment (user equipment, UE), for example, a mobile phone (mobile phone), a tablet computer (pad), a computer with a wireless transceiver function, a virtual reality (virtual reality, VR) terminal device, or an augmented reality (augmented reality, AR) terminal device. The terminal device alternatively is a wireless terminal in industrial control (industrial control), a machine type communication (machine type communication, MTC) terminal, customer premises equipment (customer premises equipment, CPE), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device that has a wireless communication function, a computing device, or another processing device connected to a wireless modem, a vehicle-mounted device, a wearable device, a terminal device in a 5G network, or a terminal device in a future evolved public land mobile network (public land mobile network, PLMN).

3. Access and mobility management function (access and mobility management function, AMF): An access and mobility management function is mainly used for mobility management, access management, and the like, and is used to implement functions, for example, a lawful interception function or an access authorization (or authentication) function, other than a session management function of a mobility management entity (mobility management entity, MME). In at least one embodiment, the AMF is used to implement functions of an access and mobility management function.

4. Session management function (session management function, SMF): A session management function is mainly used for session management, allocation and management of an internet protocol (internet protocol, IP) address of a terminal device, selection and management endpoints of interfaces of a user plane function, a policy control function, or a charging function, downlink data notification, and the like. In at least one embodiment, the SMF is used to implement functions of a session management function.

5. Policy control function (policy control function, PCF): A policy control function is a unified policy framework for guiding network behavior, and provides policy rule information and the like for a control plane function (such as an AMF or an SMF).

6. Application function (application function, AF): An application function is used to perform application-affected data routing, access a network exposure function, or interact with a policy framework to perform policy control.

7. Unified data management (unified data management, UDM): A unified data management is used to perform unified data management, 5G user data management, user identifier processing, access authentication, registration, mobility management, or the like.

8. Unified data repository (unified data repository, UDR): A unified data repository is used by a UDM to store subscription data or read the subscription data, or is used by a PCF to store policy data or read the policy data.

9. User plane function (user plane function, UPF): A user plane function is used to perform packet routing and forwarding, perform quality of service (quality of service, QoS) processing on user plane data, or the like. User data is accessed to a data network (data network, DN) through the user plane function. In at least one embodiment, the user plane function is configured to implement functions of a user plane function.

10. Data network (digital network, DN): A data network is a network that provides data transmission, for example, an operator service network, the Internet (Internet), and a third-party service network.

11. Network repository function (network repository function, NRF): A network repository function is used to store a network functional entity and description information of a service provided by the network functional entity, and support functions such as service discovery and network element entity discovery.

12. Network exposure function (network exposure function, NEF): A network exposure function is used to securely expose, to the outside, a service, a capability, and the like that are provided by a 3rd generation partnership project (3GPP) network function.

13. Edge application server (edge application server, EAS): In an edge computing (edge computing, EC) deployment scenario, some services are provided by a plurality of EASs deployed at a network edge. These EASs provide same services and content, but have different internet protocol (internet protocol, IP) addresses (an anycast address is not included and is not considered in at least one embodiment). In response to UE accessing the services, in the EC scenario, the UE accesses an available EAS nearest to the UE.

14. Edge application server discovery function (edge application server discovery function, EASDF): An edge application server discovery function is a new network element EASDF that assists in discovering an EAS, and a main function of the EASDF is to process a domain name system (domain name system, DNS) message based on an indication of an SMF. For example, the EASDF reports the DNS message to the SMF, adds, to a DNS query (query), an extended mechanisms for DNS (extended mechanisms for DNS, EDNS) client subnet option (client subnet option) (the EDNS client subnet option is also referred to as "ECS option" for short), forwards the DNS query to a DNS server, and forwards a DNS response (response) to UE.

In the network architecture, an N2 interface is an interface between the RAN and the AMF, and is configured to send a non-access stratum (non-access stratum, NAS) message and the like; an N3 interface is an interface between the RAN and the UPF, and is configured to transmit user plane data and the like; an N4 interface is an interface between the SMF and the UPF, and is configured to transmit information such as identification information of a tunnel connected to the N3 interface, data buffer indication information, and a downlink data notification message; an N6 interface is an interface between the UPF and the DN, and is configured to transmit user plane data between the UPF and the DN; and an N9 interface is an interface between UPFs, for example, the N9 interface is an interface between a visited-policy control function (visited-policy control function, V-PCF) and a home-policy control function (home-policy control function, H-PCF) or an interface between a UPF connected to the DN and a UPF connected to the RAN, and the N9 interface is configured to transmit user plane data between the UPFs.

The foregoing network architecture applied to at least one embodiment is merely an example of a network architecture described from a perspective of a conventional point-to-point architecture and a service-based architecture, and a network architecture applicable to at least one embodiment is not limited thereto. Any network architecture that implements functions of the foregoing network elements is applicable to at least one embodiment.

In at least one embodiment, names of network elements are merely examples. At least one embodiment does not exclude a case in which the network elements have other names in the future and a case in which functions of the network elements are combined. With evolution of technologies, any device or network element that implements functions of the foregoing network elements falls within the protection scope of at least one embodiment.

Names of interfaces between the network elements in FIG. 1 are merely examples. In specific implementation, the interfaces have other names. This is not specifically limited in at least one embodiment. In addition, names of messages (or signaling) transmitted between the foregoing network elements are merely examples, and do not constitute any limitation on functions of the messages.

For ease of understanding the technical solutions of at least one embodiment, the following briefly describes a protocol data unit (protocol data unit, PDU) session (session) with reference to content related to the technical solutions of at least one embodiment.

A PDU session is a process in which a user terminal UE communicates with a data network DN. After the PDU session is established, a data transmission channel between the UE and the DN is established. Each PDU session supports one PDU session type (for example, IPv4, IPv6, IPv4v6, Ethernet (Ethernet), and unstructured (unstructured)). One PDU session has a plurality of PDU session anchors (anchors). To support a function in which routing to the DN is selective and support a service and session continuity (service and session continuity, SSC) mode (mode) 3, an SMF controls data routing of a PDU session, to enable the PDU session to have a plurality of N6 interfaces at the same time. A UPF on each N6 interface is referred to as a PDU session anchor. A multi-PDU session anchor for a single PDU session is implemented in the following two manners.

Manner 1: Use an uplink classifier (uplink classifier, UL CL) in one PDU session.

The SMF inserts an uplink classifier “UL CL” into a data transmission path of the PDU session. A function of the “UL CL” is provided in the UPF. The “UL CL” is used to forward, to a specified path, a data packet that meets a service filtering rule, which is similar to a function of a routing table. The SMF controls insertion and deletion of the “UL CL”. The SMF performs operations on the UPF through an N4 interface. The SMF determines whether to perform operations on the UPF by depending on a capability of the UPF, that is, whether the UPF supports the “UL CL”. UE is unaware of a data forwarding function of the “UL CL” in a core network. Therefore, the UE does not participate in insertion and deletion of the “UL CL”. In response to a “UL CL” being inserted into a data path of a PDU session, the PDU session has a plurality of PDU session anchors, and these anchors provide a plurality of different paths to a same DN. A function of the “UL CL” is to forward uplink service data to different PDU session anchors based on filter usage and combine downlink data from a plurality of anchors of the UE.

FIG. 1 is considered as a scenario in which one PDU session has two PDU session anchors. An uplink classifier (UL CL) is installed on a UPF at a termination point of an N3 interface, an anchor (C-PSA) and an anchor (L-PAS) are terminated on N6 interfaces, and transmission between an uplink classifier UPF and an anchor UPF is performed through an N9 interface.

Manner 2: Use IPv6 multi-homing (multi-homing) in one PDU session.

One PDU session is associated with a plurality of IPv6 prefixes, and the PDU session is referred to as a multi-homed PDU session. The multi-homed PDU session accesses one data network DN through a plurality of PDU session anchors. Data paths corresponding to all the PDU session anchors are eventually converged on a common UPF, the common UPF has a “branching point” (branching point, BP) function, and the common UPF is referred to as a branching point UPF. A branching point forwards uplink service packets to different PDU anchors and combines downlink data from the anchors. The branching point UPF is used for charging statistics and rate control. An SMF controls insertion or removal of the branching point on a UPF through an N4 interface. The SMF performs the foregoing operations by depending on a capability of the UPF, that is, whether the UPF supports the branching pointing function.

FIG. 1 is considered as a scenario in which one PDU session has two PDU session anchors. In response to a network switching an anchor of an access network, a new anchor that accesses a same data network is first established (for example, an L-PDU session anchor (session anchor, L-PSA) in FIG. 1), and then an old anchor (for example, a C-PSA in FIG. 1) is released. In an anchor switching process, UE obtains continuous services, and services are not affected.

The foregoing content briefly describes the PDU session. To better understand the technical solutions in at least one embodiment, nouns or terms are briefly described before embodiments are described.

(1) Data network name (data network name, DNN): A data network name DNN is used to select an SMF that establishes a protocol data unit (protocol data unit, PDU) session and a UPF, or is used to determine a policy applied to the PDU session. The DNN includes two parts: (1) a network identification (identification, ID) that indicates an external network and that is mandatory; and (2) an operator ID that indicates an operator to which the DNN belongs and that is optional.

(2) Single network slice selection assistance information (single network slice selection assistance information, S-NSSAI): Single network slice selection assistance information uniquely identifies a network slice, and includes one or more data network names DNNs for an AMF to select. An SMF selected for a PDU session is specified in the DNN. NSSAI is a set of S-NSSAI, and identifies a group of network slices. In response to UE performing services, the UE selects a corresponding slice group (including an AMF/an SMF/a UPF) based on the S-NSSAI. In response to the UE performing an attach (attach) operation, the UE provides the S-NSSAI information, and a gNB selects a 5G core network (5G core network, 5GC) based on the S-NSSAI information. In response to the UE not providing related S-NSSAI information, the gNB routes NAS information of the UE to a default 5GC.

(3) Data network access identifier (data network access identifier, DNAI): A data network access identifier is an identifier for user plane access of one or more DNs that deploy an application process.

In 4G and earlier conventional mobile network architectures and deployments, user plane devices are deployed in a tree topology. An uplink user packet passes through a base station and a backhaul network, and finally accesses a data network through centrally deployed anchor gateways. These anchor gateways are generally deployed at a high location in the network, for example, a central equipment room in a large area. This topology structure is simple, and facilitates centralized service management and control and packet processing by an operator at anchors. With explosive growth of mobile service traffic, this type of deployment mode becomes increasingly difficult to support a fast-growing mobile service traffic model. In one aspect, in a network in which anchor gateways are deployed in a centralized manner, increased traffic is finally concentrated in gateways and core equipment rooms. This poses increasingly high usage on backhaul network bandwidth, an equipment room throughput, and a gateway specification. In another aspect, a backhaul network with a long distance from an access point to an anchor gateway and a complex transmission environment also cause a large delay and jitter in user packet transmission.

Based on the foregoing background, an edge computing (edge computing, EC) concept is proposed in the industry. The EC moves a UPF and a service processing capability downward to a network edge, to implement local processing of distributed service traffic. This avoids excessive traffic concentration and greatly reduces specification usage for core equipment rooms and centralized gateways. In addition, a distance of a backhaul network is shortened, and an end-to-end (end to end, E2E) delay and jitter of a user packet are reduced. This allows deployment of an ultra-low-latency services.

As mentioned earlier, in an EC deployment scenario, some services are provided by a plurality of EASs deployed at a network edge. These EASs provide same services and content, but have different IP addresses (an anycast address is not included, and is not considered in at least one embodiment). In response to UE accessing the services, in the EC scenario, the UE accesses an available EAS nearest to the UE. Therefore, the UE obtains an IP address of an appropriate EAS. A standard TS 23.548 of the 3rd generation partnership project (3rd generation partnership project, 3GPP) defines a new network element EASDF that assists in discovering an EAS. A main function of the EASDF is to process a domain name system (domain name system, DNS) message based on an indication of an SMF.

A procedure of discovering the EAS by using the EASDF is as follows: After the SMF selects the EASDF during a session establishment procedure, the SMF sends a DNS handling rule to the EASDF through a PDU session (that is, the DNS handling rule is sent at a session granularity). The DNS handling rule includes one or more of information about a fully qualified domain name (fully qualified domain name, FQDN), information about an IP address of the EAS, and information about a DNS server identifier (identifier). An FQDN range and an EAS IP address range indicate a deployment status of edge services. In response to an FQDN or an EAS IP address of a service falling within the foregoing ranges, the service is deployed at a local edge. In response to the EASDF receiving a DNS query (query) from UE, the EASDF matches an FQDN included in the DNS query with the foregoing FQDN range. In response to the FQDN falling within the FQDN range, the EASDF sends a DNS message report to the SMF, and obtains an ECS option from the SMF. The ECS option is an extension item in the DNS message and represents location information of the UE. The EASDF adds the ECS option to the DNS query and forwards the DNS query to a DNS server. After receiving a DNS response from the DNS server, the EASDF matches an EAS IP address included in the DNS response with the foregoing EAS IP address range. In response to the EAS IP address falling within the EAS IP address range, the EASDF sends a DNS message report to the SMF, and the SMF inserts a “UL CL” or a “BP” and indicates the EASDF to forward the DNS response to the UE, to complete local service discovery.

From the foregoing procedure, in response to the SMF sending deployment information of an EAS to the EASDF at a session granularity, deployment information that is of EASs and that is sent in a large number of PDU sessions is the same. As a result, information is repeatedly sent. Therefore, a technology for sending node-level deployment information of an EAS is adopted at the 3GPP SA WG2 #145E meeting. “Node-level” refers to sending information at a device granularity. That is, the SMF obtains deployment information of an EAS from a UDR at the device granularity, and sends a node-level DNS handling rule to the EASDF at the device granularity.

However, although a node-level sending technology is used in a current procedure in which the SMF obtains deployment information of an EAS from the UDR, all UEs and all PDU sessions that use a same EASDF share a same DNS handling rule. Actually, different UEs or PDU sessions have different permissions for services that are accessed through EC. For example, only UE #1 and UE #3 access a service #A, and other UEs are not authorized to access the service #A. In response to the current technical solution being used, all UEs (for example, the UE #1 to UE #10) that use a same EASDF accesses the service #A. In addition, from the foregoing procedure, the ECS option is sent and stored at a session granularity. For each PDU session, the EASDF requests an ECS option from the SMF after receiving a DNS query, thereby causing a large quantity of repeated ECS options. Therefore, a communication method is used to resolve a problem that different UEs or PDU sessions have different permissions to access EC services, and the communication method is used to resolve a problem that ECS options are repeatedly requested and sent in different PDU sessions.

In view of this, at least one embodiment provides a communication method. An SMF sends, to an EASDF, a correspondence between identification information of domain name system DNS handling information and the DNS handling information. The SMF sends, to the EASDF, a DNS handling rule that is based on the identification information of the DNS handling information, so that the EASDF uses different DNS handling information for different PDU sessions or UEs. This further implements differentiated handling of DNS messages, resolves a problem that different UEs have different permissions to access EC services, and improves service experience of a user. In addition, repeated sending of information is avoided, signaling interaction is reduced, and information processing efficiency is improved.

Actions of a UDR in the following embodiments are also performed by a UDM. In at least one embodiment, the UDR is merely used as an example for description. This is not limited herein.

In at least one embodiment, a terminal device is described by using user equipment UE as an example.

Figure 2:
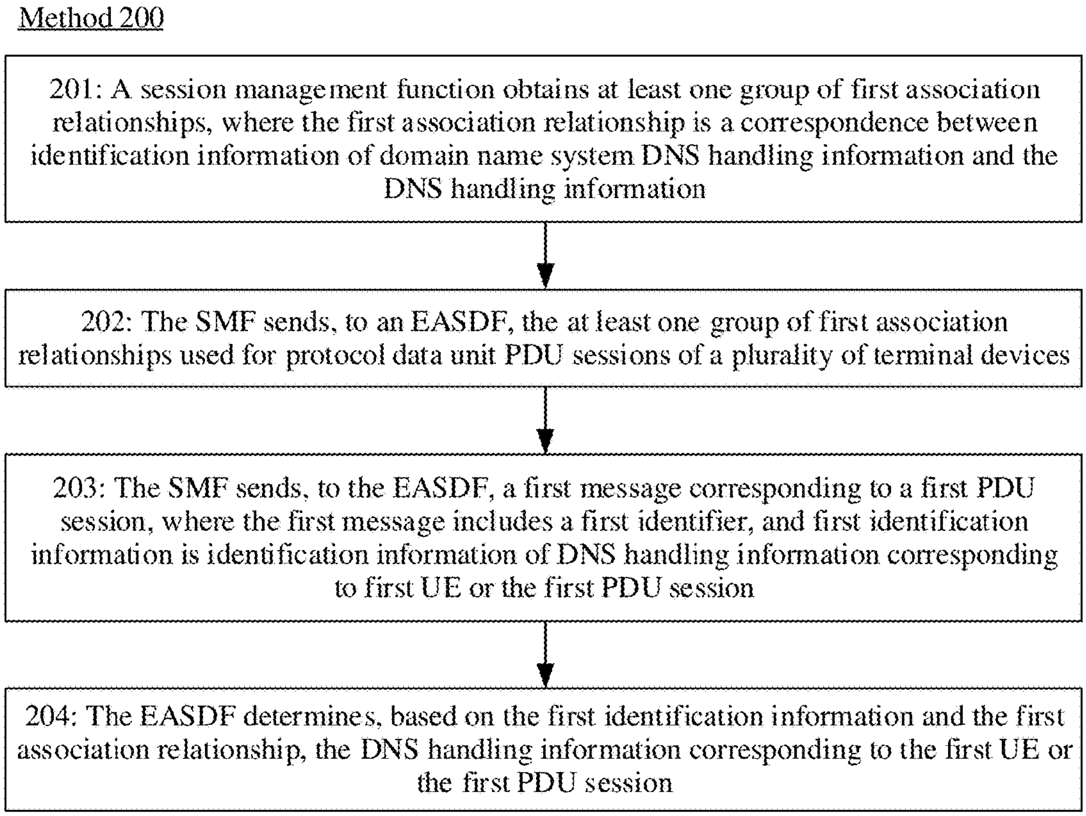
FIG. 2 is a schematic flowchart of a communication method 200 according to at least one embodiment.

FIG. 2 is a schematic flowchart of a communication method 200 according to at least one embodiment. The method in FIG. 2 includes the following steps.

Step 201: A session management function SMF obtains at least one group of first association relationships.

The first association relationship is a correspondence between identification information of domain name system DNS handling information and the DNS handling information.

In at least one embodiment, the identification information of the DNS handling information identifies the DNS handling information, and is one of the following: a UE group ID, a rule (rule) ID, a DNAI, a DNN, S-NSSAI, or the like. The rule ID indicates a corresponding rule.

In at least one embodiment, the SMF determines the first association relationship based on an obtained second association relationship (that is, an association relationship between a UE group ID and deployment information of an EAS) and the UE group ID.

In at least one embodiment, the SMF determines the first association relationship based on an obtained second association relationship, a UE group ID, and a rule ID.

In at least one embodiment, the first association relationship is configured on an EASDF.

In at least one embodiment, the DNS handling information includes DNS detection information or a DNS handling parameter. The DNS handling information alternatively includes the DNS detection information and the DNS handling parameter.

In at least one embodiment, the deployment information of the EAS includes one or more of the following: information about an FQDN corresponding to a DNAI, information about an internet protocol address of the edge application server, and identification information of a DNS server.

In at least one embodiment, in response to the DNS handling information being the DNS detection information, the DNS detection information is used by the EASDF to determine a DNS message handling action corresponding to a DNS message. Specifically, the DNS detection information is used by the EASDF to match the DNS message to determine a handling action for the DNS message. For example, the DNS detection information includes a fully qualified domain name FQDN range and/or an edge application server internet protocol address range. For another example, the DNS detection information includes a fully qualified domain name FQDN range and/or an edge application server internet protocol address range and information about a DNS message handling action. The DNS message handling action includes one or more of the following: reporting the DNS message, reporting content in the DNS message, caching the DNS message, and forwarding the DNS message.

In at least one embodiment, in response to the DNS handling information being the DNS handling parameter, the DNS handling parameter is a correspondence between a DNAI and an ECS option, and is used by the EASDF to determine the ECS option; the DNS handling parameter is a correspondence between a DNAI, and an FQDN and an ECS option, and is used by the EASDF to determine the ECS option; the DNS handling parameter is a correspondence between a DNAI and a local DNS server address, and is used by the EASDF to determine the local DNS server address; or the DNS handling parameter is a correspondence between a DNAI, and an FQDN and a local DNS server address, and is used by the EASDF to determine the local DNS server address.

In at least one embodiment, in response to the identification information of the DNS handling information being a DNAI, and the DNS handling information is the DNS handling parameter, the DNS handling parameter is an EDNS client subnet option; or in response to the identification information of the DNS handling information being a DNAI, and the DNS handling information is the DNS handling parameter, the DNS handling parameter is a correspondence between an FQDN and an EDNS client subnet option; or in response to the identification information of the DNS handling information being a DNAI, and the DNS handling information is the DNS handling parameter, the DNS handling parameter is a local DNS server address; or in response to the identification information of the DNS handling information being a DNAI, and the DNS handling information is the DNS handling parameter, the DNS handling parameter is a correspondence between an FQDN and a local DNS server address.

Step 202: The SMF sends, to the EASDF, the at least one group of first association relationships used for protocol data unit PDU sessions of a plurality of terminal devices. Correspondingly, the EASDF receives the at least one group of first association relationships used for the protocol data unit PDU sessions of the plurality of terminal devices.

In at least one embodiment, the EASDF obtains at least one group of first association relationships used for the PDU sessions of a plurality of UEs, where "the plurality of UEs" is understood as a plurality of or all of UEs to which the first association relationships are applicable. The plurality of PDU sessions is understood as a plurality of or all of PDU sessions to which the first association relationships are applicable.

In at least one embodiment, the SMF sends a "node-level DNS context" create request to the EASDF, where the request includes the first association relationship. In at least one embodiment, this step alternatively is triggered in response to the SMF receiving a PDU session establishment request, or in another manner. This is not limited herein.

Step 203: The SMF sends, to the EASDF, a first message corresponding to first UE or a first PDU session, where the first message includes first identification information. Correspondingly, the EASDF receives the first message.

In at least one embodiment, the first identification information is identification information of DNS handling information corresponding to the first UE or the first PDU session, and the first identification information is used by the EASDF to determine, based on the first identification information and the first association relationship, the DNS handling information corresponding to the first PDU session.

For example, the first identification information is a UE group ID, a rule ID, a DNAI, a DNN, S-NSSAI, or the like.

Step 204: The EASDF determines, based on the first identification information and the first association relationship, the DNS handling information corresponding to the first UE or the first PDU session.

In at least one embodiment, the EASDF determines, based on the first identification information and the first association relationship, a handling action for the DNS message. Specifically, the EASDF matches the DNS message based on the first identification information and the first association relationship, and determines the handling action for the DNS message.

In at least one embodiment, the EASDF determines the ECS option or the local DNS server address based on the first identification information and the first association relationship.

For example, the EASDF matches the DNS message based on the first identification information and the first association relationship, and determines the EDNS client subnet option by matching the DNS message. The EASDF adds the determined EDNS client subnet option to the DNS message, and sends the DNS message to a DNS server. For another example, the EASDF matches the DNS message based on the first identification information and the first association relationship, and determines the local DNS server address by matching the DNS message. The EASDF sends the DNS message to a local DNS server.

In at least one embodiment, the EASDF matches the first association relationship based on the first identification information, and determine the EDNS client subnet option by matching the first association relationship; or the EASDF matches the first association relationship based on the first identification information, and determine the local DNS server address by matching the first association relationship.

According to the method provided in at least one embodiment, the SMF sends, to the EASDF, the correspondence between the identification information of the domain name system DNS handling information and the DNS handling information. In this way, the SMF sends, to the EASDF by using different sessions or UE subscription information, differentiated deployment information of EASs for different PDU sessions or UEs, and the EASDF uses different DNS handling information. This implements differentiated handling of DNS messages, and improves service experience of a user. In addition, repeated sending of information is avoided, signaling interaction is reduced, and information processing efficiency is improved.

Figure 3A:
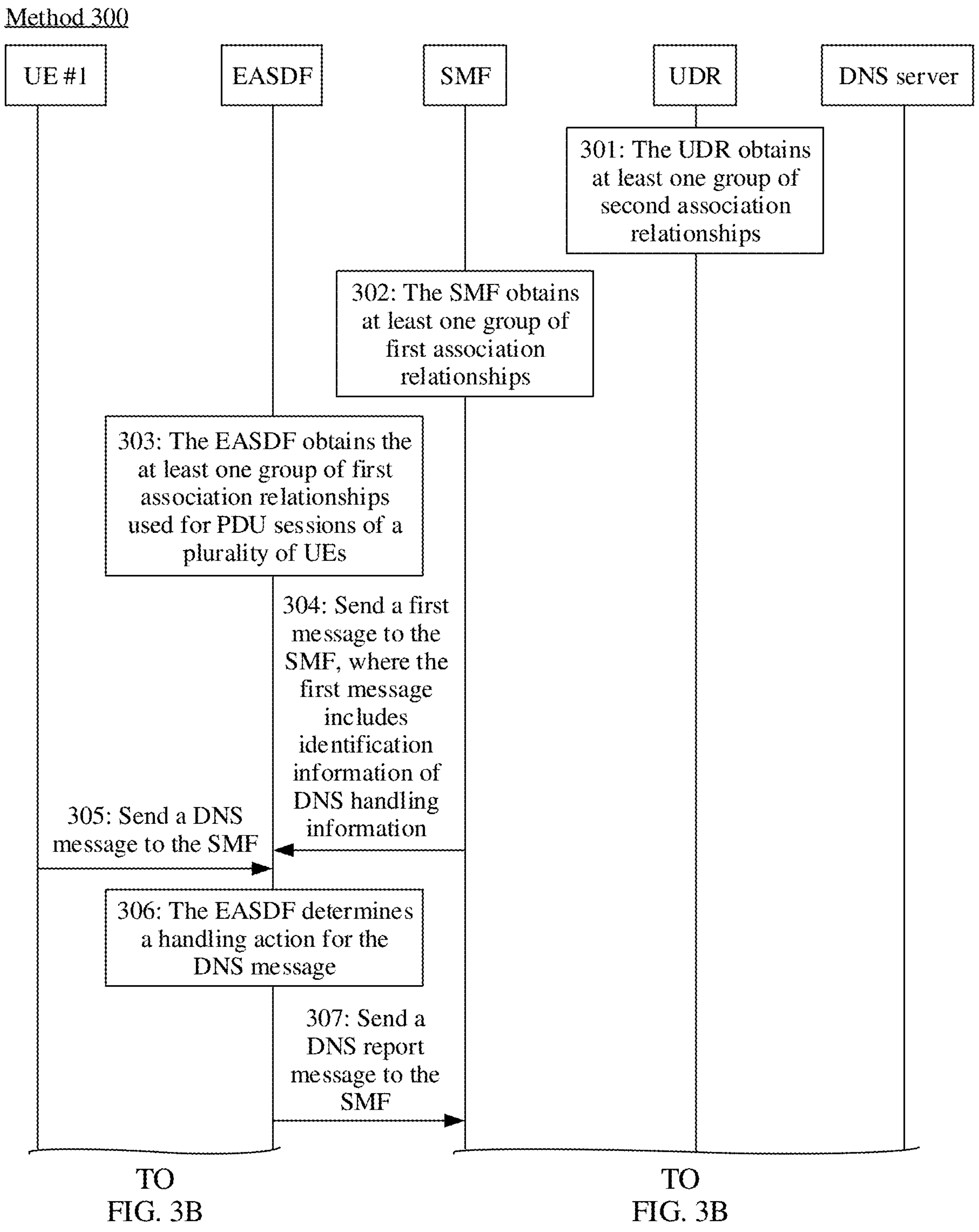
FIG. 3A and FIG. 3B are a schematic flowchart of a communication method 300 according to at least one embodiment.
Figure 3B:
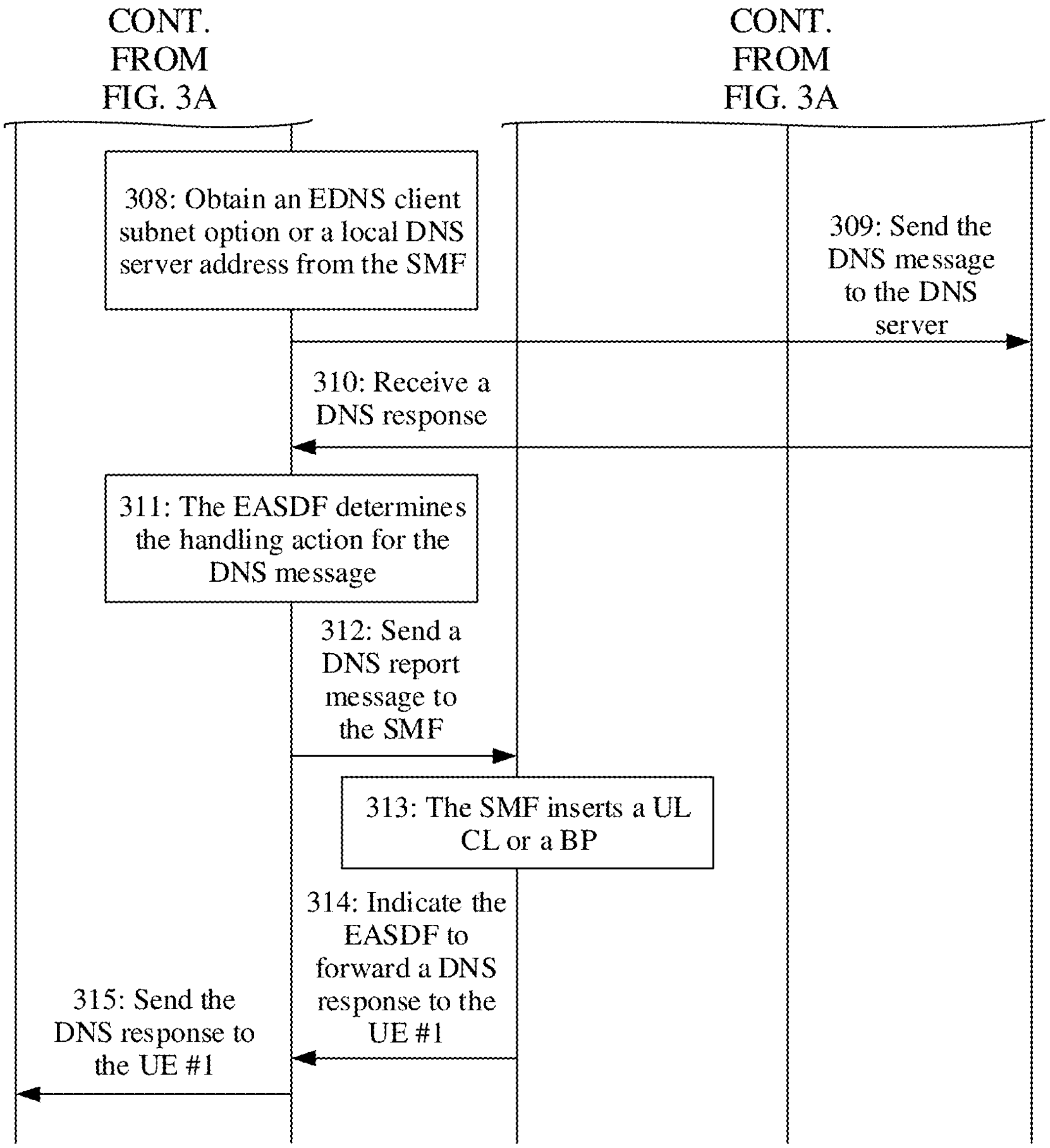

FIG. 3A and FIG. 3B are a schematic flowchart of a communication method 300 according to at least one embodiment. The method in FIG. 3A and FIG. 3B includes the following steps.

Step 301: A UDR obtains at least one group of second association relationships, where the second association relationship is a correspondence between user equipment group (UE group) identifier (identifier, ID) information (a UE group ID is an internal group ID or an external group ID) and deployment information of an edge application server.

In at least one embodiment, the deployment information of the EAS includes one or more of the following information: information about an FQDN corresponding to a DNAI, information about an IP address of the EAS, and identification information of a DNS server.

In an example, the UDR obtains an association relationship between a UE group ID #1 and deployment information of an EAS, that is, a correspondence (which is also understood as a "mapping relationship") between "the UE group ID #1 and the deployment information of the EAS". For example, the deployment information of the EAS is an FQDN range corresponding to each DNAI in the UE group ID #1, an EAS IP address range, and a DNS server identifier. That is, the second association relationship is a correspondence between "the UE group ID #1, and the FQDN range, the EAS IP address range, and the DNS server identifier".

In at least one embodiment, an AF initiates an AF request (request) to the UDR, to send, to the UDR, one or more groups of association relationships between the UE group IDs #1 and the deployment information of the EAS.

For example, an association relationship between a UE group ID and deployment information of an EAS refers to deployment information of an EAS corresponding to a service that is accessed by UE corresponding to the UE group ID through EC. In an example, a service #A only allows UE of an employee of a company #A to access through EC. A UE group ID #3 corresponds to the UE of the employee of the company #A, in deployment information of an EAS corresponding to the UE group ID #3, an FQDN range should include an FQDN corresponding to the service #A, and an EAS IP range should include an IP address of an EAS that provides the service #A. In response to a UE group ID of UE of an employee not being the UE group ID #3, deployment information of an EAS corresponding to the UE of the employee does not include the FQDN or the EAS IP, that is, the UE of the employee cannot access the service #A.

In at least one embodiment, the correspondence between the UE group ID and the deployment information of the EAS is preconfigured on the UDR, or some of the foregoing correspondences is preconfigured, and some of the foregoing correspondences is provided by the AF. In response to all of the correspondences between the UE group IDs and the deployment information of the EAS are preconfigured on the UDR, this step is skipped.

Step 302: An SMF obtains at least one group of first association relationships, where the first association relationship is a correspondence between identification information of domain name system DNS handling information and the DNS handling information.

In at least one embodiment, the DNS handling information includes DNS detection information or a DNS handling parameter.

In at least one embodiment, the DNS handling information is the DNS detection information is used as an example. That is, in this embodiment, the first association relationship is described by using the correspondence between the identification information of the domain name system DNS handling information and the DNS detection information as an example.

In this embodiment, the identification information of the DNS handling information is one of the following: a UE group ID, a rule (rule) ID, a DNAI, a DNN, S-NSSAI, or the like. For ease of description, this embodiment is described by using only an example in which the identification information of the DNS handling information is a rule ID. The rule ID mentioned in the following embodiments is any piece of the foregoing identification information of the DNS handling information. This is not limited. The rule ID indicates a corresponding rule.

This embodiment is described by using an example in which the identification information of the DNS handling information is a rule ID, and the DNS detection information is a fully qualified domain name FQDN range and/or an edge application server internet protocol address range, or the DNS detection information is an FQDN range and/or an EAS IP address range, and information about a handling action for a DNS message. In at least one embodiment, the handling action for the DNS message includes: reporting content in the DNS message to the SMF, caching the DNS message, forwarding the DNS message (for example, forwarding the DNS message to UE or a DNS server), and the like. In this embodiment, the DNS message is received by an EASDF from the UE or the DNS server.

In this embodiment, a function of the first association relationship is that the EASDF subsequently determines, based on the DNS message and the first association relationship, the handling action for the DNS message. Specifically, the EASDF subsequently determines a rule ID based on an IP address corresponding to UE, to further determine an FQDN range and/or an EAS IP address range of the UE, and the handling action for the DNS message.

In an example, in response to the DNS detection information being a fully qualified domain name FQDN range and/or an EAS IP address range, the first association relationship is, for example, a correspondence between "a rule ID #1 and an FQDN range", a correspondence between "a rule ID #1 and an EAS IP address range", a correspondence between "a rule ID #1, and an FQDN range and an EAS IP address range", or the like. A rule ID #2, a rule ID #3, . . . , a rule ID #N (N is an integer greater than 0) are similar to the rule ID #1. Details are not described again.

In at least one embodiment, the SMF requests the deployment information of the EAS from the UDR, and then the UDR sends, to the SMF, the second association relationship, that is, the association relationship between the UE group ID and the deployment information of the EAS.

In at least one embodiment, the SMF subscribes to a notification of the deployment information of the EAS, and in response to a notification condition being met, the UDR sends a notification message to the SMF, and send, to the SMF, the association relationship between the UE group ID and the deployment information of the EAS and/or the handling action for the DNS message.

Alternatively, in response to an event such as expiration of an internal timer of the SMF being triggered, the UDR sends, to the SMF, the association relationship between the UE group ID and the deployment information of the EAS.

In at least one embodiment of this step, the UDR further sends, to the SMF, an association relationship between identification information of UE and the deployment information of the EAS and an association relationship between the identification information of the UE and a UE group ID separately through two messages. In this implementation, the SMF is to determine an association relationship between the UE group ID and the deployment information of the EAS based on content of the two messages.

In at least one embodiment, the SMF locally configures a UE group ID or obtains a UE group ID from subscription data.

In at least one embodiment, the SMF locally configures a rule ID or obtains a rule ID from a PCF, where the rule ID corresponds to a UE group ID.

In at least one embodiment, the SMF determines the first association relationship based on an obtained second association relationship and a UE group ID.

In at least one embodiment, the SMF determines the first association relationship based on an obtained second association relationship, a UE group ID, and a rule ID.

In an example, in response to the DNS detection information further including information about a DNS message handling action (which is also understood as "information that is about a DNS message handling action performed by the EASDF based on a rule ID"), the first association relationship is, for example, a correspondence between "the rule ID #1, and the FQDN range and reporting content in a DNS message to the SMF", a correspondence between "the rule ID #1, and the FQDN range and forwarding a DNS message", a correspondence between "the rule ID #1, and the EAS IP address range and forwarding a DNS message", a correspondence between "the rule ID #1, and the EAS IP address range and caching a DNS message", or the like. A rule ID #2, a rule ID #3, . . . , a rule ID #N (N is an integer greater than 0) are similar to the rule ID #1. Details are not described again.

Step 303: The EASDF obtains at least one group of first association relationships used for PDU sessions of a plurality of UEs.

In at least one embodiment, the EASDF obtains the at least one group of first association relationships used for the PDU sessions of the plurality of UEs, where "the plurality of UEs" is understood as a plurality of or all of UEs to which the first association relationships are applicable. The plurality of PDU sessions is understood as a plurality of or all of PDU sessions to which the first association relationships are applicable.

In at least one embodiment, the at least one group of first association relationships used for the PDU sessions of the plurality of UEs is preconfigured on the EASDF.

In at least one embodiment, the SMF sends, to the EASDF, the at least one group of first association relationships used for the PDU sessions of the plurality of UEs.

In an example, an implementation of this step is that the SMF sends a "node-level DNS context" create request to the EASDF, where the request includes the first association relationship. In at least one embodiment, this step alternatively is triggered in response to the SMF receiving a PDU session establishment request, or in another manner. This is not limited herein.

Specifically, a "node-level DNS context" includes a "node-level DNS handling rule", and the "node-level DNS handling rule" includes at least one group of first association relationships. Alternatively, the "node-level DNS context" includes at least one group of association relationships between rule IDs and "node-level DNS handling rules", where each "node-level DNS handling rule" includes a group of DNS detection information. For example, the "node-level DNS context" includes an association relationship between "the rule ID #1 and a node-level DNS handling rule #1", an association relationship between "a rule ID #2 and a node-level DNS handling rule #2", an association relationship between "a rule ID #3 and a node-level DNS handling rule #3", and an association relationship between "a rule ID #4 and a node-level DNS handling rule #4". In an example, the node-level DNS handling rule #1 includes a group of DNS detection information. For example, the node-level DNS handling rule #1 includes a group of {FQDN ranges} or a group of {FQDN ranges, EAS IP ranges}. In another example, the node-level DNS handling rule #1 further includes a DNS message handling action. For example, the node-level DNS handling rule #1 includes a group of {FQDN ranges, EAS IP ranges, reporting content in DNS messages to the SMF}, or the node-level DNS handling rule #1 includes a group of {FQDN ranges, EAS IP ranges, forwarding DNS messages}. The node-level DNS handling rule #2, the node-level DNS handling rule #3, and the like are similar to the node-level DNS handling rule #1. Details are not described again.

In at least one embodiment, information in this step is sent by using a Neasdf_NodeLevelDNSHandlingRules_Create/Update or another message. This is not limited herein.

In at least one embodiment, the step 301 to the step 303 are performed at a node granularity. The following steps 304 to 314 are performed at a session granularity.

Step 304: The SMF sends a first message to the EASDF, where the first message includes a first identifier.

For example, a first PDU session corresponds to a message #1 (which is an example of the first message), and the first message includes a rule ID (which is an example of the first identifier).

In this embodiment, the first identifier is DNS handling information corresponding to first UE or the first PDU session.

In this embodiment, the first identifier is one of the following: a UE group ID, a rule (rule) ID, a DNAI, a DNN, S-NSSAI, or the like. For ease of description, this embodiment is described by using only an example in which the first identifier is a rule ID. The rule ID mentioned in the following embodiments is any one of the foregoing first identifiers. This is not limited.

For example, the SMF sends a "session granularity DNS context" create request to the EASDF.

In at least one embodiment, the request includes an IP address of UE #1, a DNN of a PDU session, and a "session granularity DNS handling rule". The "session granularity DNS handling rule" includes a rule ID. The rule ID herein refers to an ID corresponding to a PDU session or UE associated with the PDU session. For example, a rule ID associated with the first PDU session is a rule ID #1.

In at least one embodiment, the request includes an IP address of UE #1, a DNN of a PDU session, a "session granularity DNS handling rule", and a rule ID. In this case, the rule ID is not included in the "session granularity DNS handling rule", but is used as an information element in parallel with the IP address of the UE #1, the DNN of the PDU session, and the "session granularity DNS handling rule". The rule ID is sent by the SMF to the EASDF in this step.

In at least one embodiment, information in this step is sent by using a Neasdf_DNSContext_Create/Update Request or another message. This is not limited herein.

Optionally, indication information #1 (which is an example of first indication information) is further sent in this step. A function of the indication information #1 is to indicate the EASDF to handle a DNS message based on the "node-level DNS handling rule" after the EASDF receives a DNS query sent by the UE #1 or receives a DNS response sent by a DNS server. Certainly, the foregoing logic is also configured on the EASDF in response to the EASDF being delivered from a factory or in response to a network being deployed. In this case, the indication information #1 is able to not be sent.

Step 305: The UE #1 (which is an example of the first UE) sends a DNS query (which is an example of the DNS message) to the EASDF, where the DNS query includes an FQDN. Correspondingly, the EASDF receives the DNS query.

Step 306: The EASDF determines, based on the DNS query, the session granularity DNS context, and the node-level DNS context, a handling action for the DNS message.

In at least one embodiment, the EASDF determines, based on the UE group ID and the first association relationship, the handling action for the DNS message.

In at least one embodiment, the EASDF matches the DNS message based on the UE group ID and the first association relationship, and determines the handling action for the DNS message.

In an example, after receiving the DNS query sent by the UE #1, the EASDF performs the following steps. (1) The EASDF determines, based on the IP address of the UE #1 and/or the DNN of the PDU session and the session granularity DNS context, a rule ID corresponding to the PDU session. For example, the EASDF determines a source (source) IP address of the DNS query sent by the UE #1 as the IP address of the UE #1. Because the session granularity DNS context already includes the IP address of the UE #1, the DNN of the PDU session, and the rule ID (it is assumed that a rule ID corresponding to the UE #1 is a rule ID #1), the EASDF determines, based on the IP address of the UE #1 and/or the DNN of the PDU session, that a rule ID of the UE #1 is the rule ID #1. (2) The EASDF determines, based on the rule ID (and the indication information #1, in response to the indication information #1 being included in the step 304) and the node-level DNS context, an FQDN range and/or the handling action for the DNS message. The node-level DNS context includes one or more groups of first association relationships, that is, an association relationship between a rule ID and the DNS detection information. Therefore, the FQDN range and the handling action for the DNS message is determined based on the rule ID. As the EASDF matches the DNS message. (3) The EASDF determines, based on the FQDN range, whether to perform the handling action for the DNS message, for example, whether to report the DNS message to the SMF. A scenario considered in at least one embodiment is that the EASDF successfully determines the FQDN range, that is, a scenario in which the EASDF successfully matches an FQDN in the DNS message sent by the UE #1 with an FQDN range included in the first association relationship sent by the SMF. In this case, the EASDF sends a DNS report message to the SMF.

In response to the EASDF failing to determine an FQDN range in response to performing the step (2), the EASDF does not report to the SMF. Subsequent steps are separated from the EC scenario, and are not discussed in at least one embodiment.

Step 307: The EASDF sends a DNS report message to the SMF.

The EASDF performs matching between an FQDN included in the DNS query and an FQDN range included in the first association relationship sent by the SMF. In response to the FQDN falling within the FQDN range, the EASDF sends the DNS report message to the SMF, where the DNS report message includes an FQDN corresponding to the DNS query.

Step 308: The EASDF obtains the ECS option or the local DNS server address from the SMF.

As described above, the ECS option is an extension item in the DNS message, and represents location information of UE.

Once the EASDF sends the DNS report message to the SMF in the step 307, the SMF sends, to the EASDF, an ECS option or an address of a local DNS server of the UE.

Step 309: The EASDF forwards the DNS message to a DNS server. The corresponding DNS server receives the DNS message.

In at least one embodiment, the EASDF adds the ECS option to the DNS query, and forwards, to the DNS server, the DNS message to which the ECS option is added.

In at least one embodiment, the EASDF forwards the DNS message to the local DNS server obtained in the step 308.

Step 310: The EASDF receives a DNS response from the DNS server, where the DNS response includes an FQDN or an IP address of the server.

In at least one embodiment, the DNS response includes an EAS IP address.

Step 311: The EASDF determines, based on the DNS response, the session granularity DNS context, and the node-level DNS context, a handling action for the DNS message (that is, the DNS response).

In at least one embodiment, the EASDF determines, based on the rule ID and the first association relationship, the handling action for the DNS message.

In at least one embodiment, the EASDF matches the DNS message based on the rule ID and the first association relationship, and determine the handling action for the DNS message.

In an example, after receiving the DNS response, the EASDF sequentially performs the following steps. (1) The EASDF determines, based on the IP address of the UE #1 and/or the DNN of the PDU session and the session granularity DNS context, a rule ID corresponding to the UE #1. For example, the EASDF determines a destination (destination) IP address of the DNS response as the IP address of the UE #1. Because the session granularity DNS context includes the IP address of the UE #1, the DNN of the PDU session, and the rule ID (it is assumed that a rule ID corresponding to the UE #1 is a rule ID #1), the EASDF determines, based on the IP address of the UE #1 and/or the DNN of the PDU session, that a rule ID of the UE #1 is the rule ID #1. (2) The EASDF determines, based on the UE rule ID (and the indication information #1, in response to the indication information #1 being included in the step 304) and the node-level DNS context, the EAS IP range and/or the handling action for the DNS message. Because the node-level DNS context includes one or more groups of association relationships between the rule ID and the EAS IP range and/or the handling action for the DNS message, the EAS IP range and the handling action for the DNS message is determined based on the rule ID. As the EASDF matches the DNS message. (3) The EASDF determines, based on the EAS IP address range, whether to perform the handling action for the DNS message, for example, whether to cache the DNS message and report the DNS message to the SMF. A scenario considered in at least one embodiment is that the EASDF successfully determines the EAS IP range, that is, a scenario in which the EASDF successfully matches a server IP address in the DNS response with an EAS IP address included in the first association relationship sent by the SMF. In this case, the EASDF caches the DNS message, and then sends a DNS report message to the SMF, where the DNS report message includes an EAS IP address corresponding to the DNS response.

In response to the EASDF failing to determine the EAS IP range in response to performing the step (2), the EASDF does not report to the SMF. Subsequent steps are separated from the EC scenario, and are not discussed in at least one embodiment.

Step 312: The EASDF sends the DNS report message to the SMF, where the DNS report message includes an FQDN or an EAS IP address corresponding to the DNS response.

After receiving the DNS response from the DNS server, the EASDF matches an FQDN or a server IP address range included in the DNS response. In response to the FQDN or the server IP address range included in the DNS response falling within the FQDN range or the EAS IP address range included in the first association relationship, the EASDF sends the DNS report message to the SMF, where the DNS report message includes the FQDN or the EAS IP address corresponding to the DNS response.

Step 313: The SMF inserts a UL CL or a BP.

Specifically, the SMF inserts the UL CL and a local UPF based on the FQDN or the EAS IP address included in the DNS report message.

Step 314: The SMF indicates the EASDF to forward the DNS response to the UE #1.

In at least one embodiment, the SMF indicates the EASDF to forward the DNS response to the UE #1.

Step 315: The EASDF forwards the DNS response to the UE #1, thereby completing local service discovery.

According to the method provided in this embodiment, the SMF sends, to the EASDF, a DNS handling rule that is based on the identification information of the DNS handling information, so that the EASDF uses different DNS handling information for different PDU sessions or UEs. This implements differentiated handling of DNS messages, and improves service experience of a user.

Figure 4A:
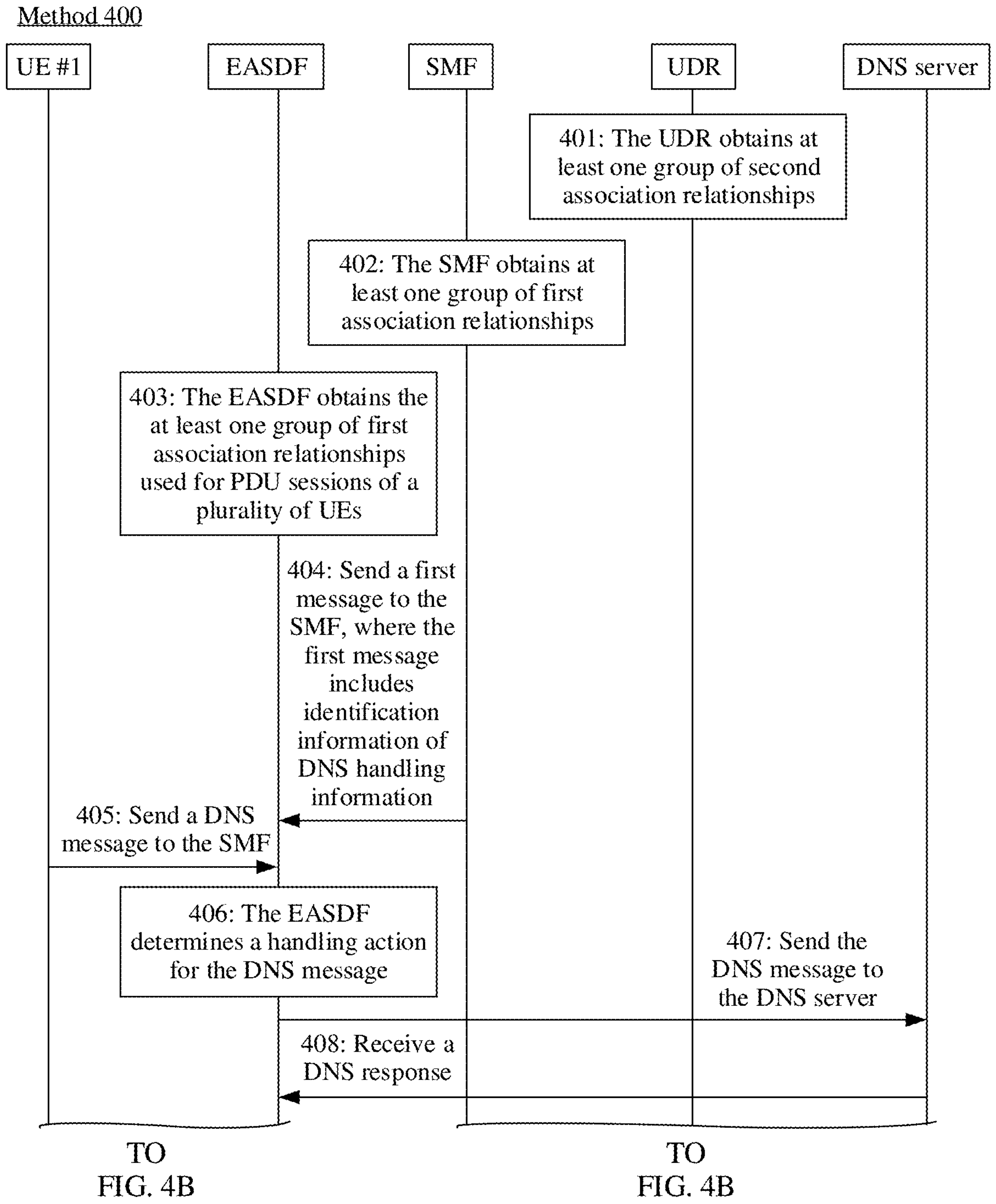
FIG. 4A and FIG. 4B are a schematic flowchart of a communication method 400 according to at least one embodiment.
Figure 4B:
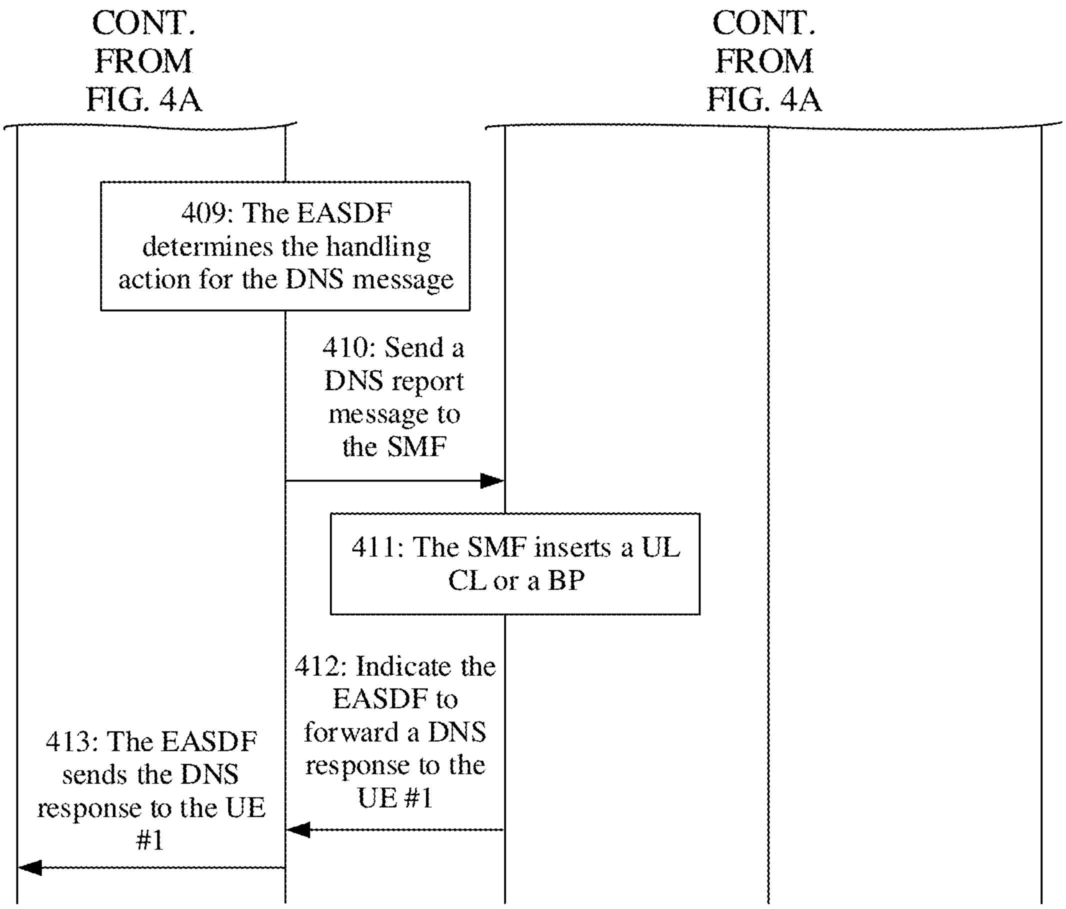

FIG. 4A and FIG. 4B are a schematic flowchart of a communication method 400 according to at least one embodiment. The method 400 includes the following steps.

For step 401, refer to step 301 in the method 300. Details are not described again.

Step 402: An SMF obtains at least one group of first association relationships, where the first association relationship is a correspondence between identification information of domain name system DNS handling information and the DNS handling information.

Manner 1:

In at least one embodiment, the DNS handling information includes DNS detection information and a DNS handling parameter.

The first association relationship in this embodiment is a correspondence between the identification information of the domain name system DNS handling information and the DNS detection information, that is, a correspondence between "the identification information of the DNS handling information and the DNS detection information" (which is described as a first association relationship a for ease of distinguishing, the first association relationship a is specifically described in the method 300, and details are not described herein again). Alternatively, the first association relationship in this embodiment is an association relationship between the identification information of the domain name system DNS handling information and the DNS handling parameter, that is, an association relationship between "the identification information of the DNS handling information and the DNS handling parameter" (which is described as a first association relationship b for ease of distinguishing). In at least one embodiment, the SMF obtains at least one group of first association relationships a and at least one group of first association relationships b at the same time. The following describes the first association relationship b.

In this embodiment, the identification information of the DNS handling information is one of the following: a UE group ID, a rule (rule) ID, a DNAI, a DNN, S-NSSAI, or the like. For ease of description, this embodiment is described by using only an example in which the identification information of the DNS handling information is a rule ID. The rule ID mentioned in the following embodiments is any piece of the foregoing identification information of the DNS handling information. This is not limited.

This embodiment is described by using an example in which the identification information of the DNS handling information is a rule ID, and the DNS detection information is a correspondence between a DNAI and an ECS option, or the DNS detection information is a correspondence between a DNAI, and an FQDN and an ECS option, or the DNS detection information is a correspondence between a DNAI and a local DNS server address, or the DNS detection information is a correspondence between a DNAI, and an FQDN and a local DNS server address. In this embodiment, the first association relationship b is used by an EASDF to determine the ECS option and the local DNS server address by using identification information (for example, a rule ID) of DNS handling information corresponding to UE, and the EASDF is able to not send a DNS message to the SMF to report, to request the ECS option or the local DNS server address. In an example, the first association relationship b is shown in Table 1 and Table 2.

TABLE 1

| Identification information of DNS handling information | DNS handling parameter |
|---|---|
| Rule ID #1 | DNAI #1—(FQDN #1)—ECS option #1<br>DNAI #2—(FQDN #2)—ECS option #2<br>. . . |
| Rule ID #2 | DNAI #3—(FQDN #3)—ECS option #3<br>DNAI #4—(FQDN #4)—ECS option #4<br>. . . |
| . . . | |

TABLE 2

| Identification information of DNS handling information | DNS handling parameter |
|---|---|
| Rule ID #1 | DNAI #1—(FQDN #1)—local DNS server address #1<br>DNAI #2—(FQDN #2)—local DNS server address #2<br>. . . |
| Rule ID #2 | DNAI #3—(FQDN #3)—local DNS server address #3<br>DNAI #4—(FQDN #4)—local DNS server address #4<br>. . . |
| . . . | |

A DNAI and an FQDN in an {association relationship between a DNAI and an (FQDN) and an ECS option} cannot be exactly the same as a DNAI and an FQDN in another {association relationship between a DNAI and an (FQDN) and an ECS option}, and a DNAI and an FQDN in an {association relationship between a DNAI and an (FQDN) and a local DNS server address} cannot be exactly the same as a DNAI and an FQDN in another {association relationship between a DNAI and an (FQDN) and a local DNS server address}. For example, a DNAI and an FQDN in an {association relationship between a DNAI #1 and an (FQDN) #1 and an ECS option #1} cannot be exactly the same as a DNAI and an FQDN in an {association relationship between a DNAI #2 and an (FQDN) #2 and an ECS option #2}. That is, there is no correspondence such as an {association relationship between a DNAI #1 and an (FQDN) #1 and an ECS option #1} and an {association relationship between a DNAI #1 and an (FQDN) #1 and an ECS option #2}. That is, DNAI+FQDN uniquely identifies an ECS option. In at least one embodiment, "(FQDN)" means that the FQDN is optional.

Table 1 and Table 2 are merely examples, and are not limited thereto.

In at least one embodiment, the SMF requests deployment information of an EAS from a UDR, and then the UDR sends, to the SMF, the second association relationship, that is, an association relationship between a UE group ID and deployment information of an EAS.

In at least one embodiment, the SMF subscribes to a notification of the deployment information of the EAS, and in response to a notification condition being met, the UDR sends a notification message to the SMF, and send, to the SMF, the association relationship between the UE group ID and the deployment information of the EAS and/or the handling action for the DNS message.

Alternatively, in response to an event such as expiration of an internal timer of the SMF being triggered, the UDR sends, to the SMF, the association relationship between the UE group ID and the deployment information of the EAS.

In at least one embodiment of this step, the UDR further sends, to the SMF, an association relationship between identification information of UE and the deployment information of the EAS and an association relationship between the identification information of the UE and a UE group ID separately through two messages. In this implementation, the SMF determines an association relationship between the UE group ID and the deployment information of the EAS based on content of the two messages.

In at least one embodiment, the SMF locally configures a UE group ID or obtains a UE group ID from subscription data.

In at least one embodiment, the SMF locally configures a rule ID or obtains a rule ID from a PCF, where the rule ID corresponds to a UE group ID.

In at least one embodiment, the SMF determines the first association relationship based on an obtained second association relationship and a UE group ID.

In at least one embodiment, the SMF determines the first association relationship based on an obtained second association relationship, a UE group ID, and a rule ID.

In at least one embodiment, the SMF determines the first association relationship based on an obtained second association relationship, a UE group ID, and UPF deployment information. The UPF deployment information is a correspondence between a UPF and a DNAI or a correspondence between a DNAI and an ECS option. The UPF deployment information is locally configured on the SMF.

In at least one embodiment, the SMF determines the first association relationship based on an obtained second association relationship, a UE group ID, a rule ID, and UPF deployment information.

Specifically, in at least one embodiment, the SMF determines an association relationship between a rule ID and a list of {association relationships between DNAIs and (FQDNs) and ECS options}, or determine an association between a rule ID and a list of {association relationships between DNAIs and (FQDNs) and local DNS server addresses}. The UPF deployment information is a correspondence between the UPF and the DNAI, or the UPF deployment information is a correspondence between the DNAI and the ECS option. The UPF deployment information is locally configured on the SMF, or obtained by the UPF from a network repository function (network repository function, NRF). In this case, the first association relationship b is used by the EASDF to determine the ECS option based on the rule ID, or the first association relationship b is used by the EASDF to determine the local DNS server address based on the rule ID.

Manner 2:

Alternatively, the first association relationship obtained by the SMF is a correspondence between "the identification information of the DNS handling information, and the DNS detection information and the DNS handling parameter". A relationship between "the identification information of the DNS handling information, and the DNS detection information and the DNS handling parameter" is that a rule ID is mapped to the DNS detection information and the DNS handling parameter.

In this case, the first association relationship is a correspondence between the identification information of the domain name system DNS handling information and the DNS detection information and the DNS handling parameter. For example, in this case, the first association relationship is a correspondence between "a rule ID, and an FQDN range and/or an EAS IP range and an {association relationship between a DNAI and an (FQDN) and an ECS option}", or a correspondence between "a rule ID, and an FQDN range and/or an EAS IP range and a DNS message handling action, and an {association relationship between a DNAI and an (FQDN) and an ECS option}", or a correspondence between "a rule ID, and an FQDN range and/or an EAS IP range and an {association relationship between a DNAI and an (FQDN) and a local DNS server address}", or a correspondence between "a rule ID, and an FQDN range and/or an EAS IP range and a DNS message handling action, and an {association relationship between a DNAI and an (FQDN) and a local DNS server address}".

Step 403: The EASDF obtains at least one group of first association relationships used for PDU sessions of a plurality of UEs.

In at least one embodiment, the EASDF obtains the at least one group of first association relationships used for the PDU sessions of the plurality of UEs, where "the plurality of UEs" is understood as a plurality of or all of UEs to which the first association relationships are applicable. The plurality of PDU sessions is understood as a plurality of or all of PDU sessions to which the first association relationships are applicable.

In this embodiment, as described above, in at least one embodiment, the EASDF obtains the first association relationship a and the first association relationship b at the same time.

In at least one embodiment, the at least one group of first association relationships used for the PDU sessions of the plurality of UEs is preconfigured on the EASDF.

In at least one embodiment, the SMF sends, to the EASDF, the at least one group of first association relationships used for the PDU sessions of the plurality of UEs.

In an example, an implementation of this step is that the SMF sends a "node-level DNS context" create request to the EASDF, where the request includes the first association relationship. In at least one embodiment, this step alternatively is triggered in response to the SMF receiving a PDU session establishment request, or in another manner. This is not limited herein.

Specifically, in at least one embodiment, a "node-level DNS context" includes a "node-level DNS handling rule", and the "node-level DNS handling rule" includes at least one group of first association relationships, for example, at least one group of first association relationships a and at least one group of first association relationships b.

Alternatively, in at least one embodiment, the "node-level DNS context" includes at least one group of association relationships between a rule ID and a "node-level DNS handling rule" and a list of {association relationships between DNAIs and (FQDNs) and ECS options} (that is, DNS handling parameters). In this case, the "node-level DNS context" includes at least one group of association relationships between first association relationships b and rule IDs and "node-level DNS handling rules". Each node-level DNS handling rule includes a group of DNS detection information. In an example, the "node-level DNS context" includes an association relationship between "a rule ID #1 and a node-level DNS handling rule #1" and an association relationship between "a rule ID #2 and {an association relationship between a DNAI 2 and an (FQDN #2) and an ECS option #2}" (that is, the first association relationship b). For example, the node-level DNS handling rule #1 includes a group of DNS detection information. For example, the node-level DNS handling rule #1 includes a group of {FQDN ranges}, includes a group of {FQDN ranges, EAS IP ranges}, includes a group of {FQDN ranges, EAS IP ranges, handling actions for DNS messages}, and or the like.

Alternatively, in at least one embodiment, the "node-level DNS context" includes at least one group of association relationships between rules ID and "node-level DNS handling rules". Each node-level DNS handling rule includes a group of DNS detection information and a group of DNS handling parameters. In an example, the "node-level DNS context" includes an association relationship between "the rule ID #1 and the node-level DNS handling rule #1", where the node-level DNS handling rule #1 includes a group of DNS detection information and a group of DNS handling parameters. For example, the node-level DNS handling rule #1 includes a group of {FQDN ranges} and a list of {association relationships between DNAIs and (FQDNs) and ECS options}, includes a group of {FQDN ranges, EAS IP ranges} and a list of {association relationships between DNAIs and (FQDNs) and ECS options}, includes a group of {FQDN ranges, EAS IP ranges, handling actions for DNS messages} and a list of {association relationships between DNAIs and (FQDNs) and local DNS server addresses}, or the like.

In this embodiment, information in this step is sent by using a Neasdf_NodeLevelDNSHandlingRules_Create/Update or another message. This is not limited herein.

In at least one embodiment, the step 401 to the step 403 are performed at a node granularity. The following steps 404 to 412 are performed at a session granularity.

Step 404: The SMF sends a first message to the EASDF, where the first message includes a first identifier.

In response to the identification information of the DNS handling information not being a DNAI, the first message further includes a DNAI corresponding to a location of UE associated with a PDU session.

For example, a first PDU session corresponds to a message #1 (which is an example of the first message), and the first message includes a rule ID (which is an example of the first identifier).

The first identifier in at least one embodiment is the DNS handling information corresponding to first UE or the first PDU session.

In this embodiment, the first identifier is one of the following: a UE group ID, a rule (rule) ID, a DNAI, a DNN, S-NSSAI, or the like. For ease of description, this embodiment is described by using only an example in which the first identifier is a rule ID. The rule ID mentioned in the following embodiments is any one of the foregoing first identifiers. This is not limited.

For example, the SMF sends a "session granularity DNS context" create request to the EASDF.

In at least one embodiment, the request includes an IP address of UE #1, an identifier of a DNN of a PDU session, and a "session granularity DNS handling rule". The "session granularity DNS handling rule" includes a rule ID and a DNAI. The rule ID is an ID corresponding to a PDU session or UE associated with the PDU session. For example, a rule ID of UE associated with a first session is a rule ID #1. The DNAI is a DNAI corresponding to a location of UE associated with a PDU session.

In at least one embodiment, the request includes an IP address of UE #1, an identifier of a DNN of a PDU session, a "session granularity DNS handling rule", and a rule ID. In this case, the rule ID is not included in the "session granularity DNS handling rule", but is used as an information element in parallel with the IP address of the UE #1, the DNN of the PDU session, and the "session granularity DNS handling rule". The rule ID is sent by the SMF to the EASDF in this step.

In at least one embodiment, information in this step is sent by using a Neasdf_DNSContext_Create/Update Request or another message. This is not limited herein.

Optionally, indication information #1 (which is an example of first indication information) is further sent in this step. A function of the indication information #1 is to indicate the EASDF to handle a DNS message based on the "node-level DNS handling rule" after the EASDF receives a DNS query sent by the UE #1 or receives a DNS response sent by a DNS server. Certainly, the foregoing logic is also configured on the EASDF in response to the EASDF being delivered from a factory or in response to a network being deployed. In this case, the indication information #1 is able to not be sent.

Step 405: The UE #1 (which is an example of the first UE) sends a DNS query (which is an example of the DNS message) to the EASDF, where the DNS query includes an FQDN. Correspondingly, the EASDF receives the DNS query.

Step 406: The EASDF determines an ECS option or a local DNS server address of the UE #1 based on the DNS query, the session granularity DNS context, and the node-level DNS context.

In at least one embodiment, the EASDF determines the ECS option or the local DNS server address of the UE #1 based on the rule ID and the first association relationship b.

In at least one embodiment, the EASDF matches the DNS message based on the rule ID and the first association relationship b, and determines the ECS option or the local DNS server address of the UE #1.

For example, after receiving the DNS query sent by the UE #1, the EASDF determines the ECS option or the local DNS server address based on the DNS query, the session granularity DNS context, and the node-level DNS context.

In an example, after receiving the DNS query sent by the UE #1, the EASDF performs the following steps. (1) The EASDF determines, based on the IP address of the UE #1 and/or the DNN of the PDU session and the session granularity DNS context, a rule ID corresponding to the PDU session. For example, the EASDF determines a source (source) IP address of the DNS query sent by the UE #1 as the IP address of the UE #1. Because the session granularity DNS context already includes the IP address of the UE #1, the DNN of the PDU session, and the rule ID (it is assumed that a rule ID corresponding to the UE #1 is a rule ID #1), the EASDF determines, based on the IP address of the UE #1, that a rule ID of the UE #1 is the rule ID #1. (2) The EASDF determines, based on the rule ID (and the indication information #1, in response to the indication information #1 being included in the step 304) and the node-level DNS context, the DNS handling parameter. For example, the EASDF determines a list of {association relationships between DNAIs and (FQDNs) and ECS options} based on the rule ID, or determine a list of {association relationships between DNAIs and (FQDNs) and local DNS server addresses} based on the rule ID. Because the node-level DNS context includes one or more groups of first association relationships b, that is, an association relationship between the rule ID and the DNS handling parameter, the DNS handling parameter is determined based on the rule ID. (3) The EASDF determines the ECS option or the local DNS server address based on the DNS handling parameter and the DNAI, or based on the DNS handling parameter, the DNAI, and the DNS query. For example, the ECS option or the local DNS server address is determined based on the DNAI, an FQDN included in the DNS query, and a list of {association relationships between DNAIs and (FQDNs) and ECS options} or an {association relationship between a DNAI and an (FQDN) and a local DNS server address}.

The foregoing steps (1), (2), and (3) is also understood as that the EASDF performs matching on the DNS message. A scenario considered in at least one embodiment is that the EASDF successfully determines the ECS option or the local DNS server address, that is, a scenario in which the EASDF successfully matches the DNS message sent by the UE #1 with an association relationship that is between "the rule ID and the DNS handling parameter" and that is included in the first association relationship sent by the SMF. As a scenario in which the EASDF successfully determines the ECS option of the UE #1 or the local DNS server address of the UE #1.

In response to performing the step (2), the EASDF fails to determine the DNS handling parameter, the EASDF does not report to the SMF. Subsequent steps are separated from the EC scenario, and are not discussed in at least one embodiment. Alternatively, the EASDF reports to the SMF based on the conventional technology, and requests the ECS option or the local DNS server address. Subsequent steps are completely performed based on the conventional technology, and are not discussed in at least one embodiment.

In response to performing the step (3), the EASDF fails to determine the ECS option or the local DNS server address, the EASDF does not report to the SMF. Subsequent steps are separated from the EC scenario, and are not discussed in at least one embodiment. Alternatively, the EASDF reports to the SMF based on the conventional technology, and obtain the ECS option or the local DNS server address from the SMF. Subsequent steps are completely performed based on the conventional technology, and are not discussed in at least one embodiment.

Step 407: The EASDF sends the DNS message to a DNS server. The corresponding DNS server receives the DNS message.

Specifically, after the EASDF determines the ECS option or the local DNS server address, for the ECS option, the EASDF adds the determined ECS option to the DNS message (for example, the DNS query), and forward, to the DNS server, the DNS message to which the ECS option is added. In response to the EASDF determining the local DNS server address, the EASDF sends the DNS message to a local DNS server.

Step 408: The EASDF receives a DNS response from the DNS server, where the DNS response includes an FQDN or an IP address of the server.

In at least one embodiment, the DNS response includes an EAS IP address.

Step 409: The EASDF determines, based on the DNS response, the session granularity DNS context, and the node-level DNS context, a handling action for the DNS message (that is, the DNS response).

In at least one embodiment, the EASDF determines, based on the rule ID and the first association relationship a, the handling action for the DNS message.

In at least one embodiment, the EASDF matches the DNS message based on the rule ID and the first association relationship a, and determines the handling action for the DNS message.

For details, refer to step 311 in the method 300. Details are not described herein again.

Step 410: The EASDF sends a report message to the SMF, where the report message includes an FQDN or an EAS IP address corresponding to the DNS response.

After receiving the DNS response from the DNS server, the EASDF matches an FQDN or an EAS IP address range included in the DNS response. In response to the FQDN or the EAS IP address range included in the DNS response falling within the FQDN range or the EAS IP address range included in the first association relationship, the EASDF sends the DNS report message to the SMF, where the DNS report message includes the FQDN or the EAS IP address corresponding to the DNS response.

Step 411: The SMF inserts a UL CL or a BP.

Specifically, the SMF inserts the UL CL and a local UPF based on the FQDN or the EAS IP address included in the DNS report message.

Step 412: The SMF indicates the EASDF to forward the DNS response to the UE #1.

In at least one embodiment, the SMF indicates the EASDF to forward the DNS response to the UE #1.

Step 413: The EASDF forwards the DNS response to the UE #1, thereby completing local service discovery.

According to the method provided in this embodiment, the SMF sends, to the EASDF, a DNS handling information that identifies a message granularity of the DNS handling information, so that the EASDF uses different DNS handling information for different PDU sessions or UEs. This implements differentiated handling of DNS messages, and improves service experience of a user. In addition, the EASDF determines the ECS option or the local DNS server address based on the node-level DNS context, thereby avoiding repeated sending of the ECS option, reducing signaling interaction, and improving information processing efficiency.

Figure 5:
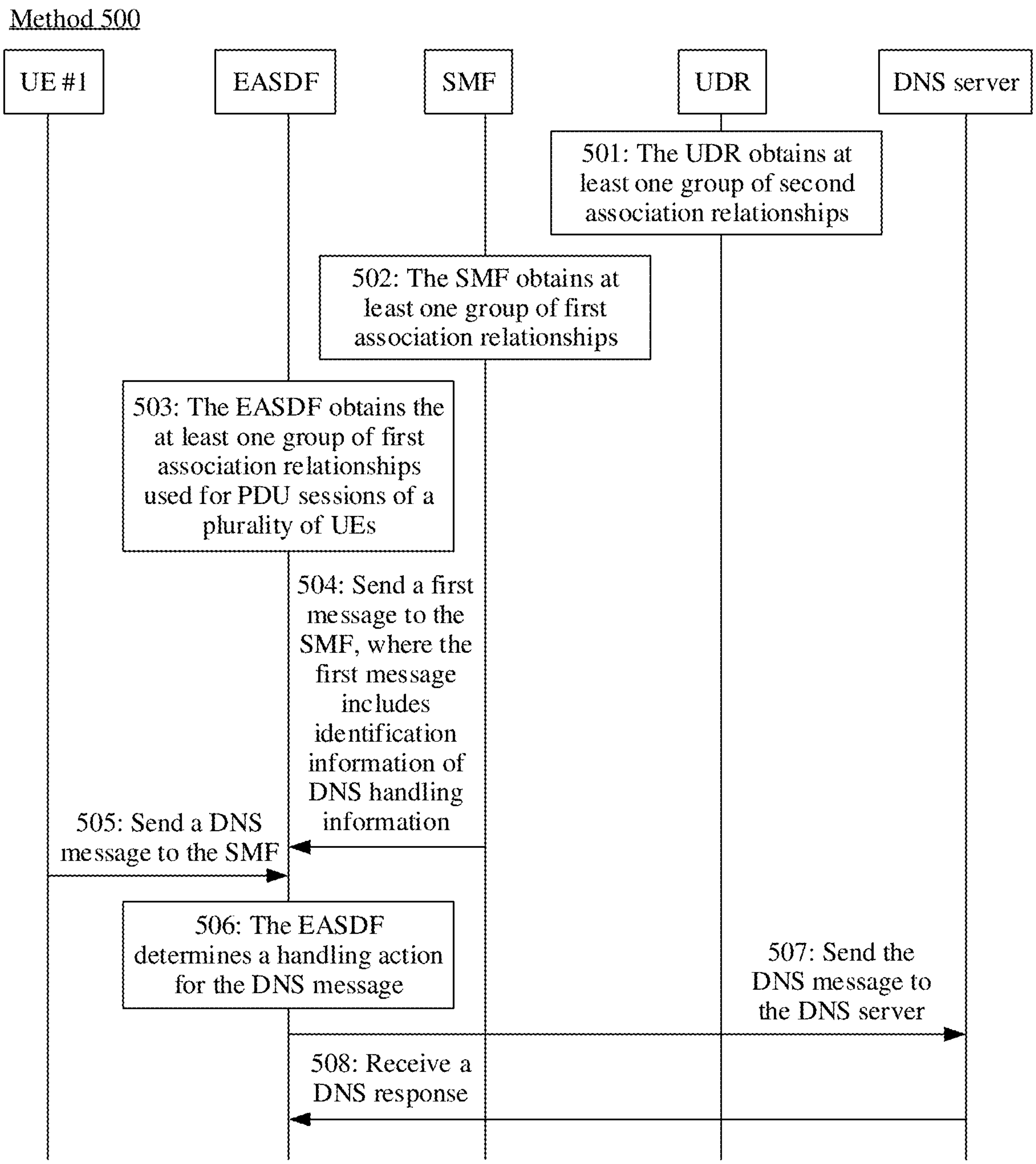
FIG. 5 is a schematic flowchart of a communication method 500 according to at least one embodiment.

FIG. 5 is a schematic flowchart of a communication method 500 according to at least one embodiment. The method in FIG. 5 includes the following steps.

For step 501, refer to the step 301 in the method 300. Details are not described again.

Step 502: An SMF obtains at least one group of first association relationships, where the first association relationship is a correspondence between identification information of domain name system DNS handling information and the DNS handling information.

In at least one embodiment, the DNS handling information includes DNS detection information or a DNS handling parameter.

The first association relationship in this embodiment is an association relationship between the identification information of the domain name system DNS handling information and the DNS handling information parameter.

This embodiment is described by using an example in which the identification information of the DNS handling information is a data network access identifier DNAI, and the DNS handling information parameter is an ECS option, or by using an example in which the identification information of the DNS handling information is a data network access identifier DNAI, and the DNS handling information parameter is a correspondence between an FQDN and an ECS option, or by using an example in which the identification information of the DNS handling information is a data network access identifier DNAI, and the DNS handling information parameter is a local DNS server, or by using an example in which the identification information of the DNS handling information is a data network access identifier DNAI, and the DNS handling information parameter is a correspondence between an FQDN and a local DNS server.

A function of the first association relationship in this embodiment is that the EASDF subsequently determines the ECS option or the local DNS server address based on a DNS message and the first association relationship. Specifically, the EASDF determines the ECS option or the local DNS server address by using a DNAI (and a requested FQDN) corresponding to UE, and is able to not send a DNS message to the SMF to request the ECS option.

In at least one embodiment, the SMF requests deployment information of an EAS from a UDR, and then the UDR sends, to the SMF, the second association relationship, that is, an association relationship between a UE group ID and deployment information of an EAS.

In at least one embodiment, the SMF subscribes to a notification of the deployment information of the EAS, and in response to a notification condition being met, the UDR sends a notification message to the SMF, and send, to the SMF, the association relationship between the UE group ID and the deployment information of the EAS and/or the handling action for the DNS message.

Alternatively, in response to an event such as expiration of an internal timer of the SMF being triggered, the UDR sends, to the SMF, the association relationship between the UE group ID and the deployment information of the EAS.

In at least one embodiment of this step, the UDR further sends, to the SMF, an association relationship between identification information of UE and the deployment information of the EAS and an association relationship between the identification information of the UE and a UE group ID separately through two messages. In this implementation, the SMF determines an association relationship between the UE group ID and the deployment information of the EAS based on the two messages.

Specifically, in at least one embodiment, the SMF determines, based on the second association relationship (that is, the association relationship between the UE group ID and the deployment information of the EAS) and UPF deployment information, an association relationship between a DNAI and an ECS option, or an association relationship between a DNAI and {an FQDN and an ECS option}, or an association relationship between a DNAI and a local DNS server address, or an association relationship between a DNAI and {an FQDN and a local DNS server address}.

Step 503: The EASDF obtains at least one group of first association relationships used for PDU sessions of a plurality of UEs.

In at least one embodiment, the EASDF obtains at least one group of first association relationships used for the PDU sessions of a plurality of UEs, where "the plurality of UEs" is understood as a plurality of or all of UEs to which the first association relationships are applicable. The plurality of PDU sessions is understood as a plurality of or all of PDU sessions to which the first association relationships are applicable.

In at least one embodiment, the at least one group of first association relationships used for the PDU sessions of the plurality of UEs is preconfigured on the EASDF.

In at least one embodiment, the SMF sends, to the EASDF, the at least one group of first association relationships used for the PDU sessions of the plurality of UEs.

In an example, an implementation of this step is that the SMF sends a "node-level DNS context" create request to the EASDF, where the request includes the first association relationship. In at least one embodiment, this step alternatively is triggered in response to the SMF receiving a PDU session establishment request, or in another manner. This is not limited herein.

Specifically, in at least one embodiment, a "node-level DNS context" includes a "node-level DNS handling rule", and the "node-level DNS handling rule" includes at least one group of first association relationships. For example, the "node-level DNS handling rule" includes a correspondence between "a DNAI and an ECS option", or the "node-level DNS handling rule" includes a correspondence between "a DNAI and {an FQDN and an ECS option}", or the "node-level DNS handling rule" includes a correspondence between "a DNAI and a local DNS server address", or the "node-level DNS handling rule" includes a correspondence between "a DNAI and {an FQDN and a local DNS server address}".

In at least one embodiment, the "node-level DNS context" includes an association relationship between the identification information of the DNS handling information and the "node-level DNS handling rule", and the "node-level DNS handling rule" includes the DNS handling parameter. For example, the "node-level DNS handling rule" includes the ECS option, and the "node-level DNS context" includes one or more groups of correspondences between DNAIs and ECS options. Alternatively, the "node-level DNS handling rule" includes a correspondence between "an FQDN and an ECS option", and the "node-level DNS context" includes one or more groups of correspondences between DNAIs, FQDNs, and ECS options. Alternatively, the "node-level DNS handling rule" includes a correspondence between local DNS server addresses, and the "node-level DNS context" includes one or more groups of correspondences between DNAIs and local DNS server addresses. Alternatively, the "node-level DNS handling rule" includes a correspondence between "an FQDN and a local DNS server address", and the "node-level DNS context" includes one or more groups of correspondence between DNAIs, FQDNs, and local DNS server addresses.

In this embodiment, information in this step is sent by using a Neasdf_NodeLevelDNSHandlingRules_Create/Update or another message. This is not limited herein.

In at least one embodiment, the step 501 to the step 503 are performed at a node granularity. The following steps 504 to 508 are performed at a session granularity.

Step 504: The SMF sends a first message to the EASDF, where the first message includes a first identifier.

In at least one embodiment, the first identifier is DNS handling information corresponding to first UE or the first PDU session.

For example, a first PDU session corresponds to a message #1 (which is an example of the first message), and the first message includes a DNAI (which is an example of the first identifier).

For example, the SMF sends a "session granularity DNS context" create request to the EASDF.

In at least one embodiment, the request includes an IP address of UE #1, a DNN of a PDU session, and a "session granularity DNS handling rule". The "session granularity DNS handling rule" includes a DNAI. The DNAI is a DNAI corresponding to a location of UE associated with a PDU session.

In at least one embodiment, the request includes an IP address of UE #1, a DNN of a PDU session, a "session granularity DNS handling rule", and a DNAI. In this case, the DNAI is not included in the "session granularity DNS handling rule", but is used as an information element in parallel with the IP address of the UE #1, the DNN of the PDU session, and the "session granularity DNS handling rule". The DNAI is sent by the SMF to the EASDF in this step.

In at least one embodiment, information in this step is sent by using a Neasdf_DNSContext_Create/Update Request or another message. This is not limited herein.

Optionally, indication information #1 (which is an example of first indication information) is further sent in this step. A function of the indication information #1 is to indicate the EASDF to handle a DNS message based on the "node-level DNS handling rule" after the EASDF receives a DNS query sent by the UE #1 or receives a DNS response sent by a DNS server. Certainly, the foregoing logic is also configured on the EASDF in response to the EASDF being delivered from a factory or in response to a network being deployed. In this case, the indication information #1 is able to not be sent.

Step 505: The UE #1 (which is an example of the first UE) sends a DNS query (which is an example of the DNS message) to the EASDF, where the DNS query includes an FQDN. Correspondingly, the EASDF receives the DNS query.

Step 506: The EASDF determines an ECS option or a local DNS server address of the UE #1 based on the DNS query, the session granularity DNS context, and the node-level DNS context.

In at least one embodiment, the EASDF determines the ECS option or the local DNS server address of the UE #1 based on the DNAI and the first association relationship.

In at least one embodiment, the EASDF matches the DNS message based on the DNAI and the first association relationship, and determine the ECS option or the local DNS server address of the UE #1.

For example, after receiving the DNS query sent by the UE #1, the EASDF determines the ECS option or the local DNS server address based on the DNS query, the session granularity DNS context, and the node-level DNS context.

In an example, after receiving the DNS query sent by the UE #1, the EASDF performs the following steps. (1) The EASDF determines, based on the IP address of the UE #1 and/or the DNN of the PDU session and the session granularity DNS context, a DNAI corresponding to the UE #1. For example, the EASDF determines a source (source) IP address of the DNS query sent by the UE #1 as the IP address of the UE #1. Because the session granularity DNS context already includes the IP address of the UE #1 and/or the DNN of the PDU session and the DNAI (it is assumed that a UE DNAI corresponding to the UE #1 is a DNAI #1), the EASDF determines, based on the IP address of the UE #1, that a DNAI of the UE #1 is the DNAI #1. (2) The EASDF determines, based on the DNAI (and the indication information #1, in response to the indication information #1 being included in the step 304, or the FQDN, in response to the FQDN being included in the association relationship) and the node-level DNS context, the ECS option or the local DNS server address. Because the node-level DNS context includes one or more groups of first association relationships, that is, association relationships between "DNAIs and (FQDNs) and ECS options" or association relationships between "DNAIs and (FQDNs) and local DNS server addresses", the ECS option or the local DNS server address is determined based on the DNAI (and the FQDN included in the DNS query, in response to the FQDN being included in the association relationship).

The foregoing steps (1) and (2) are also understood as that the EASDF performs matching on the first association relationship, to determine the ECS option or the local DNS server address. A scenario considered in at least one embodiment is that the EASDF successfully determines the ECS option or the local DNS server address, that is, a scenario in which the EASDF successfully matches the DNS message sent by the UE #1 with "an association relationship between a DNAI and an (FQDN) and an ECS option" or "an association relationship between a DNAI and an (FQDN) and a local DNS server address" included in the first association relationship sent by the SMF. A scenario exists in which the EASDF successfully determines the ECS option of the UE #1 or the local DNS server address of the UE #1. In this embodiment, "(FQDN)" means that the FQDN is optional.

In response to performing the step (2), the EASDF fails to determine the ECS option or the local DNS server address, the EASDF does not report to the SMF. Subsequent steps are separated from the EC scenario, and are not discussed in at least one embodiment. Alternatively, the EASDF reports to the SMF based on the conventional technology, and requests the ECS option. Subsequent steps are completely performed based on the conventional technology, and are not discussed in at least one embodiment.

Step 507: The EASDF sends the DNS message to a DNS server. The corresponding DNS server receives the DNS message.

Specifically, after the EASDF determines the ECS option or the local DNS server address, for the ECS option, the EASDF adds the determined ECS option to the DNS message (for example, the DNS query), and forward, to the DNS server, the DNS message to which the ECS option is added. In response to the EASDF determining the local DNS server address, the EASDF sends the DNS message to a local DNS server.

Step 508: The EASDF receives a DNS response from the DNS server, where the DNS response includes an FQDN or an IP address of the server.

In at least one embodiment, the DNS response includes an EAS IP address.

Subsequently, the EASDF matches content of the DNS response, determines whether to send a report message to the SMF, and caches the DNS message. Once the EASDF sends the report message to the SMF, the SMF inserts a UL CL or a BP. Subsequently, the SMF indicates the EASDF to forward the DNS response to the UE #1, and the EASDF forwards the DNS response to the UE #1, thereby completing local service discovery. Details are not described in at least one embodiment again.

According to the method provided in this embodiment, the SMF sends, to the EASDF, the association relationship between the DNAI and the ECS option or the association relationship between the DNAI and the local DNS server address at a node granularity, so that EASDF determines the ECS option or the local DNS server address based on the node-level DNS context. This avoids repeated sending of the ECS option, reduces signaling interaction, and improves information processing efficiency.

To clearly describe the technical solutions in at least one embodiment, terms such as "first" and "second" are used in at least one embodiment to distinguish between same items or similar items that have basically same functions and purposes. For example, first information and second information are merely used to distinguish between different information, and do not limit sequences of the first information and the second information. A person skilled in the art understands that the terms such as "first" and "second" do not limit a quantity or an execution sequence, and the terms such as "first" and "second" do not indicate a definite difference.

In at least one embodiment, "one or more of the following" or a similar expression thereof refers to any combination of these terms, including any combination of a single term or a plurality of terms. For example, one or more of a, b, or c represents a, b, c; a and b; a and c; b and c; or a, b, and c, where a, b, and c each is singular or plural.

In at least one embodiment, "when" and if mean that an apparatus performs corresponding processing in an objective situation, and are not intended to limit time. The terms do not mean that the apparatus has a determining action during implementation, and do not mean any other limitation.

The foregoing describes in detail the communication method provided in at least one embodiment with reference to FIG. 2 to FIG. 5. The following describes an apparatus provided in at least one embodiment with reference to FIG. 6 and FIG. 7. Descriptions of apparatus embodiments correspond to descriptions of the method embodiments. Therefore, for content that is not described in detail, refer to the foregoing method embodiments. For brevity, details are not described herein again.

The foregoing mainly describes the solutions provided in at least one embodiment from a perspective of interaction between nodes. To implement the foregoing functions, each node, for example, an SMF, an EASDF, or a UDR, includes a corresponding hardware structure and/or a corresponding software module for performing each function. A person skilled in the art should be able to be aware that, in combination with examples described in at least one embodiment, units and algorithm steps is implemented by hardware or a combination of hardware and computer software in at least one embodiment. Whether a function is performed by hardware or hardware driven by computer software depends on particular applications and design constraints of the technical solutions. A person skilled in the art uses different methods to implement the described functions for each particular application, but the implementation does not goes beyond the scope embodiments described herein.

In at least one embodiment, functional modules of a terminal device or the terminal device are obtained through division based on the foregoing method examples. For example, each functional module is obtained through division based on each function, or two or more functions are integrated into one processing module. The integrated module is implemented in a form of hardware, or is implemented in a form of a software functional module. In at least one embodiment, division into modules is an example, and is merely logical function division. During actual implementation, another division manner is used. An example in which each functional module is obtained through division based on each corresponding function is used below for description.

Figure 6:
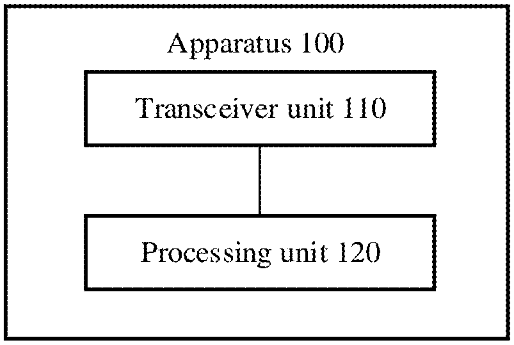
FIG. 6 is a schematic block diagram of a communication apparatus 100 according to at least one embodiment.

FIG. 6 is a schematic block diagram of an apparatus 100 according to at least one embodiment. As shown in the figure, the apparatus 100 includes a transceiver unit 110 and a processing unit 120.

In at least one embodiment, the apparatus 100 is the SMF in the foregoing method embodiments, or is a chip configured to implement a function of the SMF in the foregoing method embodiments. The apparatus 100 corresponds to the SMF in the method 200, the method 300, the method 400, and the method 500 according to at least one embodiment, and the apparatus 100 performs steps corresponding to the SMF in the method 200, the method 300, the method 400, and the method 500 in at least one embodiment. A specific process in which the units perform the foregoing corresponding steps is described in detail in the foregoing method embodiments. For brevity, details are not described herein again.

In at least one embodiment, the apparatus 100 is the EASDF in the foregoing method embodiments, or is a chip configured to implement a function of the EASDF in the foregoing method embodiments. The apparatus 100 corresponds to the EASDF in the method 200, the method 300, the method 400, and the method 500 according to at least one embodiment, and the apparatus 100 performs steps corresponding to the EASDF in the method 200, the method 300, the method 400, and the method 500 in at least one embodiment. A specific process in which the units perform the foregoing corresponding steps is described in detail in the foregoing method embodiments. For brevity, details are not described herein again.

In at least one embodiment, the apparatus 100 is the first network element in the foregoing method embodiments, for example, a UDR or a UDM, or is a chip configured to implement a function of the first network element in the foregoing method embodiments. The apparatus 100 corresponds to the UDR in the method 300, the method 400, and the method 500 according to at least one embodiment, and the apparatus 100 performs steps corresponding to the UDR in the method 200, the method 300, the method 400, and the method 500 in at least one embodiment. A specific process in which the units perform the foregoing corresponding steps is described in detail in the foregoing method embodiments. For brevity, details are not described herein again.

Figure 7:
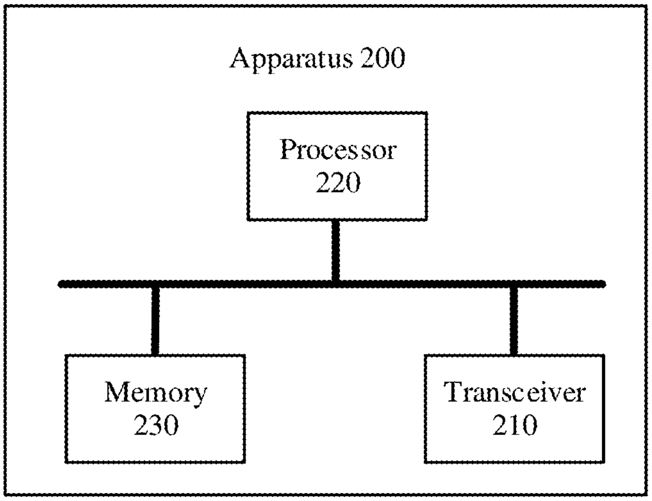
FIG. 7 is a schematic block diagram of a communication apparatus 200 according to at least one embodiment.

FIG. 7 is a schematic block diagram of an apparatus 200 according to at least one embodiment. As shown in the figure, the apparatus 200 includes at least one processor 220. The processor 220 is coupled to a memory, and is configured to execute instructions stored in the memory, to send a signal and/or receive a signal. Optionally, the apparatus 200 further includes the memory 230 that is configured to store the instructions. Optionally, the apparatus 200 further includes a transceiver 210, and the processor 220 controls the transceiver 210 to send a signal and/or receive a signal.

The processor 220 and the memory 230 are integrated into one processing apparatus. The processor 220 is configured to execute program code stored in the memory 230 to implement the foregoing functions. During specific implementation, the memory 230 alternatively is integrated into the processor 220, or is independent of the processor 220.

The transceiver 210 includes a transceiver (or referred to as a receiver machine) and a transmitter (or referred to as a transmitter machine). The transceiver further includes an antenna. There are one or more antennas. The transceiver 210 is a communication interface or an interface circuit.

Specifically, the transceiver 210 in the apparatus 200 corresponds to the transceiver unit 110 in the apparatus 100, and the processor 220 in the apparatus 200 corresponds to the processing unit 120 in the apparatus 200.

A specific process in which the transceiver and the processor perform the foregoing corresponding steps is described in detail in the foregoing method embodiments. For brevity, details are not described herein again.

In at least one embodiment, the apparatus 200 is the SMF in the foregoing method embodiments. In at least one embodiment, the apparatus 200 is the EASDF in the foregoing method embodiments. In at least one embodiment, the apparatus 200 is the first network element in the foregoing method embodiments, for example, a UDR or a UDM.

In an implementation process, steps in the foregoing methods are implemented by using a hardware integrated logical circuit in the processor, or by using instructions in a form of software. Steps of the methods disclosed with reference to at least one embodiment are directly executed and accomplished by a hardware processor, or is executed and accomplished by using a combination of hardware and a software module in the processor. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The processor in at least one embodiment is an integrated circuit chip, and has a signal processing capability. In an implementation process, steps in the foregoing method embodiments are implemented by using a hardware integrated logical circuit in the processor, or by using instructions in a form of software. The processor is a general-purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or transistor logic device, or a discrete hardware component. The processor implements or performs the methods, the steps, and logical block diagrams that are disclosed in at least one embodiment. The general-purpose processor is a microprocessor, or the processor is any conventional processor or the like. Steps of the methods disclosed with reference to at least one embodiment is directly executed and accomplished by a hardware decoding processor, or is executed and accomplished by using a combination of hardware and a software module in the decoding processor. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in at least one embodiment is a volatile memory or a non-volatile memory, or includes a volatile memory and a non-volatile memory. The non-volatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. Through example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch-link DRAM, SLDRAM), and a direct rambus dynamic random access memory (direct ram-bus RAM, DR RAM). The memory of the systems and methods described in at least one embodiment includes but is not limited to these and any memory of another proper type.

According to the methods described herein, at least one embodiment further provides a computer program product. The computer program product stores computer program code. In response to the computer program code running on a computer, the computer is enabled to perform the method in any one of the embodiments of the method 200, the method 300, the method 400, and the method 500.

According to the methods described herein, at least one embodiment further provides a computer-readable medium. The computer-readable medium stores program code. In response to the program code running on a computer, the computer is enabled to perform the method in any one of the embodiments of the method 200, the method 300, the method 400, and the method 500.

According to the methods described herein, at least one embodiment further provides a system. The system includes the foregoing apparatus or device.

All or some of the foregoing embodiments are implemented by using software, hardware, firmware, or any combination thereof. In response to software being used to implement the foregoing embodiments, all or a part of the embodiments are implemented in a form of a computer program product. The computer program product includes one or more computer instructions. In response to the computer instructions being loaded and executed on a computer, the procedure or functions according to at least one embodiment are all or partially generated. The computer is a general-purpose computer, a dedicated computer, a computer network, or other programmable apparatuses. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk drive, or a magnetic tape), an optical medium (for example, a digital video disc (digital video disc, DVD)), a semiconductor medium (for example, a solid state disc (solid state disc, SSD)), or the like.

A network side device and a terminal device in the foregoing apparatus embodiments correspond to a network side device or a terminal device in the method embodiments. A corresponding module or unit performs a corresponding step. For example, a communication unit (transceiver) performs a receiving step or a sending step in the method embodiments, and a step other than the sending step and the receiving step is performed by a processing unit (processor). For a function of a specific unit, refer to a corresponding method embodiment. There are one or more processors.

Terms such as "component", "module", and "system" used in at least one embodiment indicate computer-related entities, hardware, firmware, combinations of hardware and software, software, or software being executed. For example, a component is, but is not limited to, a process that runs on a processor, a processor, an object, an executable file, an execution thread, a program, and/or a computer. As illustrated by using figures, both a computing device and an application that runs on the computing device are components. One or more components reside within a process and/or an execution thread, and a component is located on one computer and/or distributed between two or more computers. In addition, these components are executed by using various computer-readable media that store various data structures. For example, the components communicate by using a local and/or remote process and based on, for example, a signal having one or more data packets (for example, data from two components interacting with another component in a local system, a distributed system, and/or across a network such as the internet interacting with other systems by using the signal).

A person of ordinary skill in the art is aware that, in combination with the examples described in embodiments disclosed in at least one embodiment, units and algorithm steps is implemented by electronic hardware or a combination of computer software and electronic hardware. Whether the functions are performed by hardware or software depends on particular applications and design constraints of the technical solutions. A person skilled in the art uses different methods to implement the described functions for each particular application, but the implementation does not goes beyond the scope of embodiments described herein.

A person skilled in the art understands that, for the purpose of convenient and brief description, for a detailed working process of the foregoing system, apparatus, and unit, refer to a corresponding process in the foregoing method embodiments. Details are not described herein again.

In the several embodiments provided in at least one embodiment, the disclosed system, apparatus, and method is implemented in other manners. For example, the described apparatus embodiment is merely an example. For example, division into the units is merely logical function division and is other division during actual implementation. For example, a plurality of units or components is combined or integrated into another system, or some features are ignored or not performed. In addition, the displayed or discussed mutual couplings or direct couplings or communication connections is implemented by using some interfaces. The indirect couplings or communication connections between the apparatuses or units are implemented in electronic, mechanical, or other forms.

The units described as separate parts may or may not be physically separate, and parts displayed as units may or may not be physical units, are located in one position, or are distributed on a plurality of network units. Some or all of the units are selected based on actual usage to achieve the objectives of the solutions of embodiments.

In addition, functional units in at least one embodiment are integrated into one processing unit, each of the units exists alone physically, or two or more units are integrated into one unit.

In response to the functions being implemented in the form of a software functional unit and sold or used as an independent product, the functions are stored in a computer-readable storage medium. Based on such an understanding, the technical solutions of at least one embodiment essentially, or the part contributing to the conventional technology, or some of the technical solutions is implemented in a form of a software product. The software product is stored in a storage medium, and includes several instructions for instructing a computer device (which is a personal computer, a server, or a network device) to perform all or some of the steps of the methods described in at least one embodiment. The foregoing storage medium includes any medium that stores program code, such as a USB flash drive, a removable hard disk, a read-only memory (read-only memory, ROM), a random access memory (random access memory, RAM), a magnetic disk, or an optical disc.

The foregoing descriptions are merely specific implementations of at least one embodiment, but are not intended to limit the protection scope of embodiments described herein. Any variation or replacement readily figured out by a person skilled in the art within the technical scope disclosed in at least one embodiment shall fall within the protection scope of the claims. Therefore, the protection scope of this application shall be subject to the protection scope of the claims.

The invention claimed is:

1. A communication method, comprising:

obtaining, by a session management function, at least one group of first association relationships, wherein a first association relationship is a correspondence between identification information of domain name system (DNS) handling information and the DNS handling information;

sending, by the session management function to an edge application server discovery function, the at least one group of first association relationships used for protocol data unit (PDU) sessions of a plurality of terminal devices; and sending, by the session management function to the edge application server discovery function, a first message corresponding to a first PDU session, wherein the first message includes first identification information, the first identification information is identification information of DNS handling information corresponding to the first PDU session, and the first identification information is used for determining, based on the first identification information and the first association relationship, the DNS handling information corresponding to the first PDU session.

2. The method according to claim 1, wherein the identification information of the DNS handling information identifies the DNS handling information;

wherein the obtaining the identification information of the DNS handling information that identifies DNS handling information includes obtaining DNS detection information and/or a DNS handling parameter;

wherein the DNS detection information includes a fully qualified domain name (FQDN) range and/or an edge application server internet protocol address range; and the DNS handling parameter includes an Extension Mechanisms for DNS (EDNS) client subnet option or a local DNS server address.

3. The method according to claim 2, wherein the DNS detection information is used for matching a DNS message to determine a handling action for the DNS message.

4. The method according to claim 2, wherein the identification information of the DNS handling information is a data network access identifier (DNAI).

5. The method according to claim 4, wherein the DNS handling information is the DNS handling parameter, and the DNS handling parameter is the EDNS client subnet option; and wherein the obtaining the first identification information includes obtaining a first DNAI, wherein the first identification information is used for matching the first association relationship to determine the EDNS client subnet option, wherein the first DNAI is a DNAI associated with a location of a terminal device.

6. The method according to claim 4, wherein the DNS handling information is the DNS handling parameter, and the DNS handling parameter is the local DNS server address; and the first identification information is a first DNAI, and wherein the first identification information is used for matching the first association relationship to determine the local DNS server address, wherein the first DNAI is a DNAI associated with a location of a terminal device.

7. A communication method, comprising:

receiving, by an edge application server discovery function from a session management function, at least one group of first association relationships used for protocol data unit (PDU) sessions of a plurality of terminal devices, wherein a first association relationship is a correspondence between identification information of domain name system (DNS) handling information and the DNS handling information;

receiving, by the edge application server discovery function from the session management function, a first message corresponding to a first PDU session, wherein the first message includes first identification information, and the first identification information is identification information of DNS handling information corresponding to the first PDU session; and determining, by the edge application server discovery function based on the first identification information and the first association relationship, the DNS handling information corresponding to the first PDU session.

8. The method according to claim 7, wherein the identification information of the DNS handling information identifies the DNS handling information;

the DNS handling information includes DNS detection information and/or a DNS handling parameter;

wherein the DNS detection information includes a fully qualified domain name (FQDN) range and/or an edge application server internet protocol address range; and the DNS handling parameter includes an Extension Mechanisms for DNS (EDNS) client subnet option or a local DNS server address.

9. The method according to claim 8, wherein the DNS handling information is the DNS detection information, and the method further comprises:

receiving, by the edge application server discovery function, a DNS message;

matching, by the edge application server discovery function, the DNS message based on the first identification information and the first association relationship; and determining, by the edge application server discovery function, a handling action for the DNS message.

10. The method according to claim 8, wherein the identification information of the DNS handling information is a data network access identifier (DNAI).

11. The method according to claim 10, wherein the DNS handling information is the DNS handling parameter, the DNS handling parameter is the EDNS client subnet option, and the first identification information is a first DNAI, wherein the method further comprises:

receiving, by the edge application server discovery function, a DNS message from a terminal device;

matching, by the edge application server discovery function, the first association relationship based on the first identification information;

determining, by the edge application server discovery function, the EDNS client subnet option by matching the first association relationship; and adding, by the edge application server discovery function, the determined EDNS client subnet option to the DNS message, and sending the DNS message to a DNS server, wherein the first DNAI is a DNAI associated with a location of the terminal device.

12. The method according to claim 10, wherein the DNS handling information is the DNS handling parameter, the DNS handling parameter is the local DNS server address, and the first identification information is a first DNAI, the method further comprises:

receiving, by the edge application server discovery function, a DNS message from a terminal device;

matching, by the edge application server discovery function, the first association relationship based on the first identification information;

determining, by the edge application server discovery function, the local DNS server address by matching the first association relationship; and sending, by the edge application server discovery function, the DNS message to a local DNS server, wherein the first DNAI is a DNAI associated with a location of the terminal device.

13. An apparatus, comprising:

at least one memory storing programming instructions; and at least one processor coupled to the at least one memory, wherein the at least one processor is configured to execute the programming instructions to perform operations of:

obtaining at least one group of first association relationships, wherein a first association relationship is a correspondence between identification information of domain name system (DNS) handling information and the DNS handling information;

sending, to an edge application server discovery function, the at least one group of first association relationships used for protocol data unit (PDU) sessions of a plurality of terminal devices; and sending, to the edge application server discovery function, a first message corresponding to a first PDU session, wherein the first message includes first identification information, the first identification information is identification information of DNS handling information corresponding to the first PDU session, and the first identification information is used for determining, based on the first identification information and the first association relationship, the DNS handling information corresponding to the first PDU session.

14. The apparatus according to claim 13, wherein the identification information of the DNS handling information identifies the DNS handling information;

the DNS handling information includes DNS detection information and/or a DNS handling parameter;

the DNS detection information includes a fully qualified domain name (FQDN) range and/or an edge application server internet protocol address range; and the DNS handling parameter includes an Extension Mechanisms for DNS (EDNS) client subnet option or a local DNS server address.

15. The apparatus according to claim 14, wherein the DNS detection information is used for matching a DNS message to determine a handling action for the DNS message.

16. The apparatus according to claim 14, wherein the identification information of the DNS handling information is a data network access identifier (DNAI).

17. An apparatus, comprising:

at least one memory storing programming instructions; and at least one processor coupled to the at least one memory, wherein the at least one processor is configured to execute the programming instructions to perform operations of:

receiving, from a session management function, at least one group of first association relationships used for protocol data unit (PDU) sessions of a plurality of terminal devices, wherein a first association relationship is a correspondence between identification information of domain name system (DNS) handling information and the DNS handling information;

receiving, from the session management function, a first message corresponding to a first PDU session, wherein the first message includes first identification information, and the first identification information is identification information of DNS handling information corresponding to the first PDU session; and determining, based on the first identification information and the first association relationship, the DNS handling information corresponding to the first PDU session.

18. The apparatus according to claim 17, wherein the identification information of the DNS handling information identifies the DNS handling information;

the DNS handling information includes DNS detection information and/or a DNS handling parameter;

the DNS detection information includes a fully qualified domain name (FQDN) range and/or an edge application server internet protocol address range; and the DNS handling parameter includes an Extension Mechanisms for DNS (EDNS) client subnet option or a local DNS server address.

19. The apparatus according to claim 18, wherein the DNS handling information is the DNS detection information, and wherein the at least one processor is further configured to perform the operations of:

receiving a DNS message;

matching the DNS message based on the first identification information and the first association relationship; and determining a handling action for the DNS message.

20. The apparatus according to claim 18, wherein the identification information of the DNS handling information is a data network access identifier (DNAI).

* * * * *